(12) United States Patent
Wada

(10) Patent No.: US 8,908,285 B2
(45) Date of Patent: Dec. 9, 2014

(54) ZOOM LENS AND IMAGE-PICKUP APPARATUS INCLUDING THE SAME

(71) Applicant: Canon Kabushiki Kaisha, Tokyo (JP)

(72) Inventor: Ken Wada, Sakura (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/016,380

(22) Filed: Sep. 3, 2013

(65) Prior Publication Data
US 2014/0063604 A1    Mar. 6, 2014

(30) Foreign Application Priority Data

Sep. 4, 2012 (JP) ................................. 2012-194001

(51) Int. Cl.
*G02B 15/14* (2006.01)
*G02B 17/00* (2006.01)
*G02B 7/02* (2006.01)

(52) U.S. Cl.
USPC ........... 359/683; 359/557; 359/826; 359/684; 359/685; 359/686; 359/689; 359/691; 359/714; 359/717; 359/726; 359/740; 359/763; 359/766; 359/808; 359/817; 359/822; 359/823

(58) Field of Classification Search
USPC ........ 359/557, 714, 683–692, 717, 726, 740, 359/763, 766, 808, 817, 822–826
See application file for complete search history.

(56) References Cited

U.S. PATENT DOCUMENTS

| | | | |
|---|---|---|---|
| 3,944,324 A * | 3/1976 | Tajima et al. | 359/691 |
| 7,630,142 B2 | 12/2009 | Nishimura | |
| 7,692,869 B2 * | 4/2010 | Yamaguchi et al. | 359/676 |
| 8,724,231 B2 * | 5/2014 | Wada | 359/676 |
| 2010/0046074 A1 * | 2/2010 | Wada | 359/687 |
| 2010/0328783 A1 * | 12/2010 | Wada | 359/686 |

FOREIGN PATENT DOCUMENTS

| | | |
|---|---|---|
| JP | 2007-114447 A | 5/2007 |
| JP | 2007-279541 A | 10/2007 |
| JP | 2008-102398 A | 5/2008 |

* cited by examiner

*Primary Examiner* — Evelyn A. Lester
(74) *Attorney, Agent, or Firm* — Rossi, Kimms & McDowell LLP

(57) ABSTRACT

The zoom lens includes a front unit including a first positive lens unit and a second positive or negative lens unit, a reflective mirror and a rear unit including two or more lens units. During zooming, the reflective mirror is not moved, and the first lens unit and at least two lens units of the rear unit are moved. When the zoom lens is retracted into a body of an image pickup apparatus, at least one of rotation of the reflective mirror such that a normal line thereto is brought closer to parallel to an optical axis of the rear unit and axial movement thereof in a direction of the optical axis of the rear unit is performed. The front unit is moved into a space formed by the at least one of the rotation and the axial movement. Conditions of $10.5<ft/|fn|<30.0$ and $0.80<(Lf-L)/Lm<1.30$ are satisfied.

13 Claims, 15 Drawing Sheets

ZOOM LENS AND IMAGE-PICKUP APPARATUS INCLUDING THE SAME

BACKGROUND OF THE INVENTION

1. Field of the Invention

The present invention relates to a compact zoom lens having a high zoom ratio and suitable for image pickup apparatuses such as digital still cameras and video cameras.

2. Description of the Related Art

Image capturing optical systems used for image pickup apparatuses (cameras) are required to be compact as a whole, capable of reducing a thickness of the camera and configured as a zoom lens having a high zoom ratio.

There is known a retractable zoom lens which reduces distances among mutually adjacent lens units in a non-image capturing state to different distances from those thereamong in an image capturing state, whereby the lens units are retracted inside a camera body. There is also known a so-called bent zoom lens in which a reflective mirror that bends an optical axis of the image capturing optical system by 90 degrees is disposed in its optical path. There is further known a bent zoom lens that bends its optical path by using the reflective mirror in the image capturing state and that rotates the reflective mirror in the non-image capturing state to retract an object-side lens unit in a space formed by the rotation of the reflective mirror.

Japanese Patent Application Laid-open No. 2007-279541 discloses a bent zoom lens in which a reflective mirror is disposed between a second lens unit and a third lens unit counted from an object side and which rotates the reflective mirror in the non-image capturing state to retract a front unit on the object side further than the reflective mirror in a space formed by the rotation of the reflective mirror.

U.S. Pat. No. 7,630,142 discloses a zoom lens in which a reflective mirror between a third lens unit and a fourth lens unit counted from an object side and which rotates the reflective mirror in the non-image capturing state to retract a front unit on the object side further than the reflective mirror in a space formed by the rotation of the reflective mirror.

Furthermore, there is known a bent-retractable zoom lens which moves in the non-image capturing state a reflective mirror to a space different from that in the image capturing state, whereby a lens unit on an object side further than the reflective mirror is retracted.

U.S. Pat. No. 7,692,869 discloses a zoom lens in which a reflective mirror is disposed between a second lens unit and a third lens unit counted from an object side and which moves the reflective mirror and a lens unit disposed on an image side further than the reflective mirror to retract an object-side lens unit in a space formed by the movement thereof.

Such zoom lenses provided with the reflective mirror which bends the optical path of the image capturing optical system are likely to simultaneously realize a high zoom ratio and thinning of a camera. However, in order to achieve these advantages, it is important to appropriately set a lens configuration of the zoom lens, arrangement of the reflective mirror in the optical path, configurations of the respective lens units on the object and image sides further than the reflective mirror and others.

SUMMARY OF THE INVENTION

The present invention provides a zoom lens having a high zoom ratio and capable of reducing a thickness of an image pickup apparatus provided with the zoom lens.

The present invention provides as one aspect thereof a zoom lens including in order from an object side to an image side, a front unit including a first lens unit having a positive refractive power and a second lens unit having a positive or negative refractive power, a reflective mirror which bends an optical path from the front unit, and a rear unit including two or more lens units. During zooming, the reflective mirror is not moved, and the first lens unit and at least two lens units included in the two or more lens units of the rear unit are moved in directions of optical axes of the front and rear units, respectively. When the zoom lens is retracted into a body of the image pickup apparatus, at least one of rotation of the reflective mirror such that a normal line to a reflective surface of the reflective mirror is brought closer to parallel to the optical axis of the rear unit and axial movement of the reflective mirror in the direction of the optical axis of the rear unit is performed, and at least part of the front unit is moved into a space formed by the at least one of the rotation and the axial movement of the reflective mirror. The following conditions are satisfied:

$$10.5 < ft/|fn| < 30.0$$

$$0.80 < (Lf-L)/Lm < 1.30$$

where fn represents a focal length of a strongest negative power lens unit having a negative refractive power whose absolute value is maximum among those lens units each having a negative refractive power and included in the front unit, ft represents a focal length of the entire zoom lens at a telephoto end, Lm represents a length of the reflective mirror in a sectional plane including the optical axes of the front and rear units, Lf represents a sum of optical-axis-directional thicknesses of respective lens units included in the front unit, and L represents a shorter one of lengths in the direction of the optical axis of the front unit from an apex of a most-object side lens surface of the first lens unit to ends of the reflective mirror in the sectional plane after the zoom lens is retracted in the body of the image pickup apparatus.

The present invention provides another aspect thereof an image pickup apparatus including a body of the image pickup apparatus, the above zoom lens, and an image sensor which receives an image formed by the zoom lens.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

A zoom lens of each embodiment of the present invention is constituted by, in order from an object side to an image side, a front unit including a first lens unit having a positive refractive power and a second lens unit having a positive or negative refractive power, a reflective mirror which bends an optical path from the front unit, and a rear unit including two or more lens units. During zooming, the reflective mirror is not moved, while the first lens unit and at least two lens units included in the two or more lens units of the rear unit are moved in directions of optical axes of the front and rear units, respectively.

When the zoom lens is retracted into a body of an image pickup apparatus (hereinafter referred to as "a camera body"), at least one of rotation of the reflective mirror about a rotation axis and axial movement of the reflective mirror in the direction of the optical axis of the rear unit is performed. At least part of the front unit is moved into a space formed by the at least one of the rotation and the axial movement of the reflective mirror.

Figure 1:
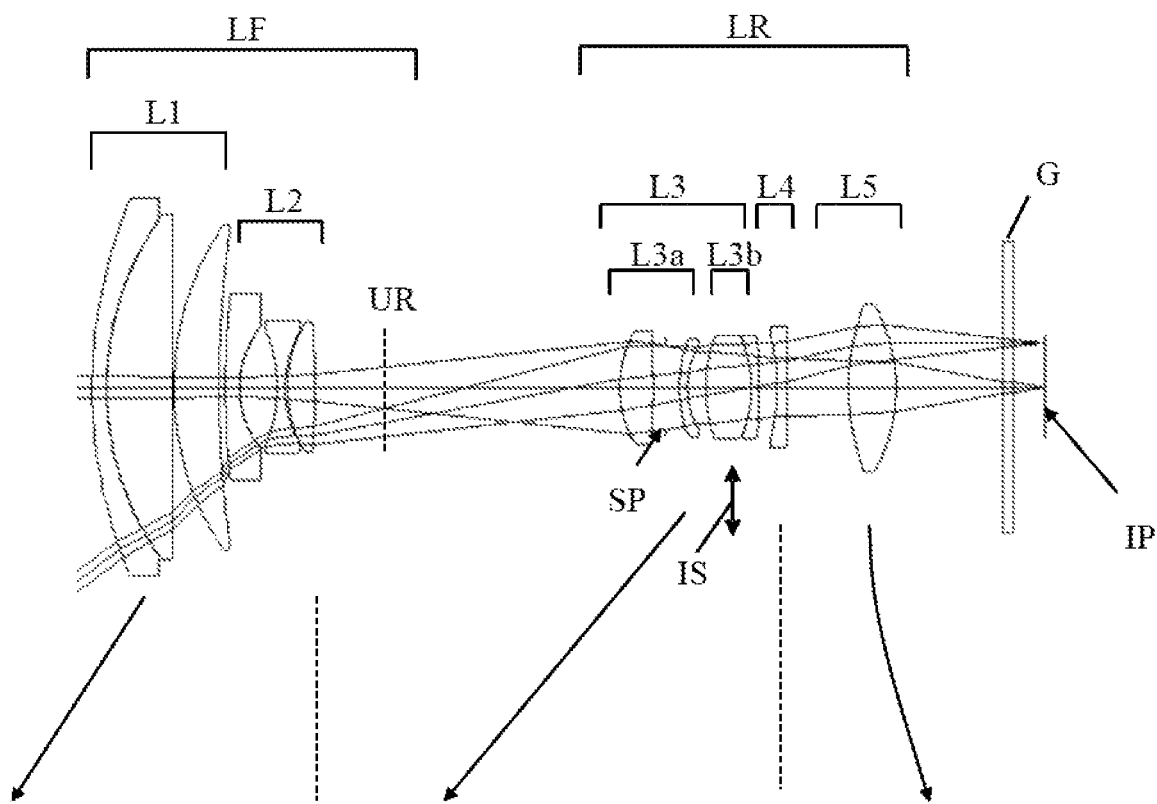
FIG. 1 is a sectional view of a zoom lens that is Embodiment 1 of the present invention at a wide-angle end, whose optical path is developed at a reflective mirror.
Figure 2A:
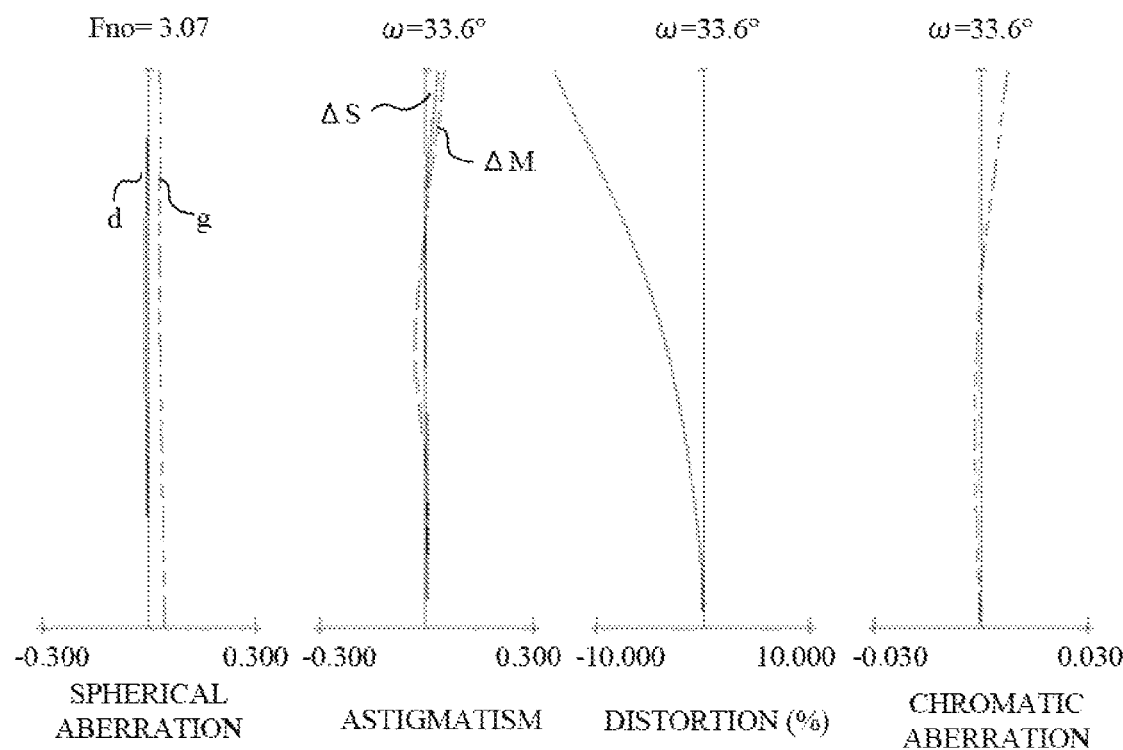
FIGS. 2A and 2B are aberration charts of the zoom lens of Embodiment 1 at the wide-angle end and at a telephoto end, respectively.
Figure 2B:
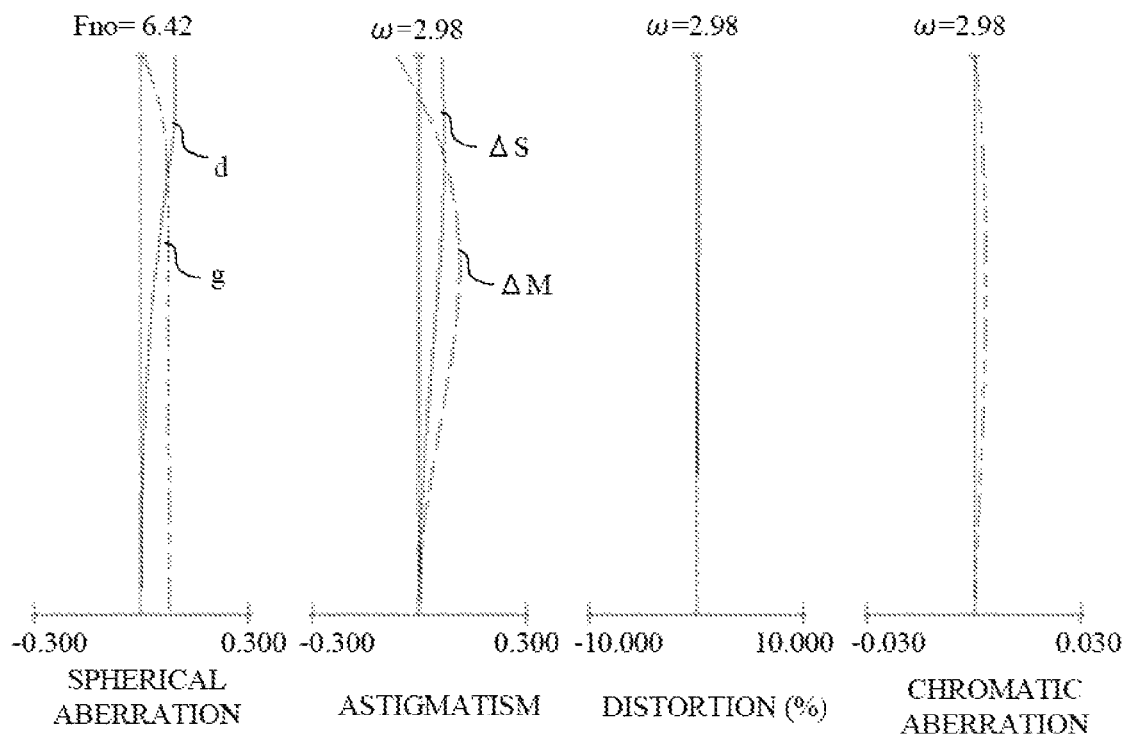
Figure 3A:
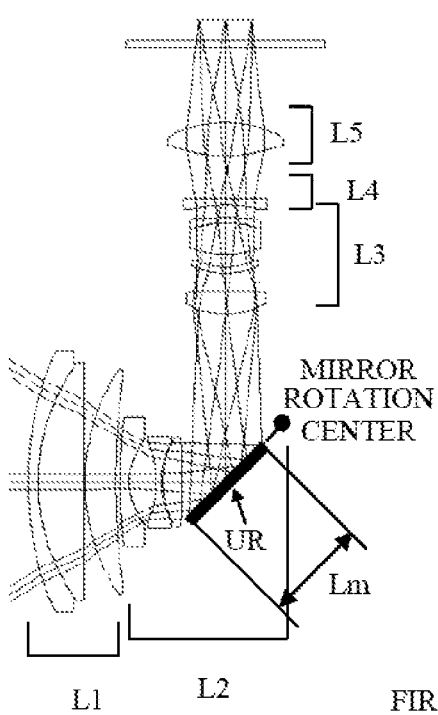
FIGS. 3A and 3B show the zoom lens of Embodiment 1 in an image capturing state and in a retracted state, respectively.
Figure 3B:
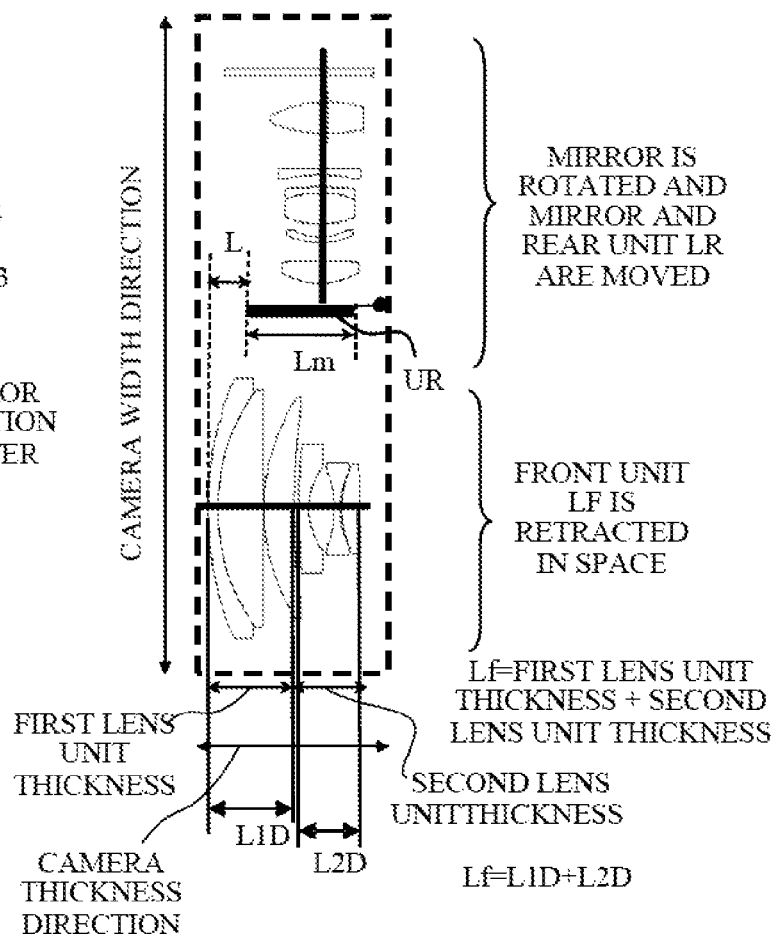

FIG. 1 shows a configuration of a zoom lens of a first embodiment (Embodiment 1) of the present invention at a wide-angle end (short focal length end). FIGS. 2A and 2B show various aberrations of the zoom lens of Embodiment 1 at the wide-angle end and at a telephoto end (long focal length end), respectively. FIG. 3A shows a configuration of the zoom lens of Embodiment 1 in an image capturing state, the optical path of the zoom lens being bent at the reflective mirror. FIG. 3B shows a configuration of the zoom lens of Embodiment 1 in a non-image capturing state, the zoom lens being retracted in the camera body.

Figure 4:
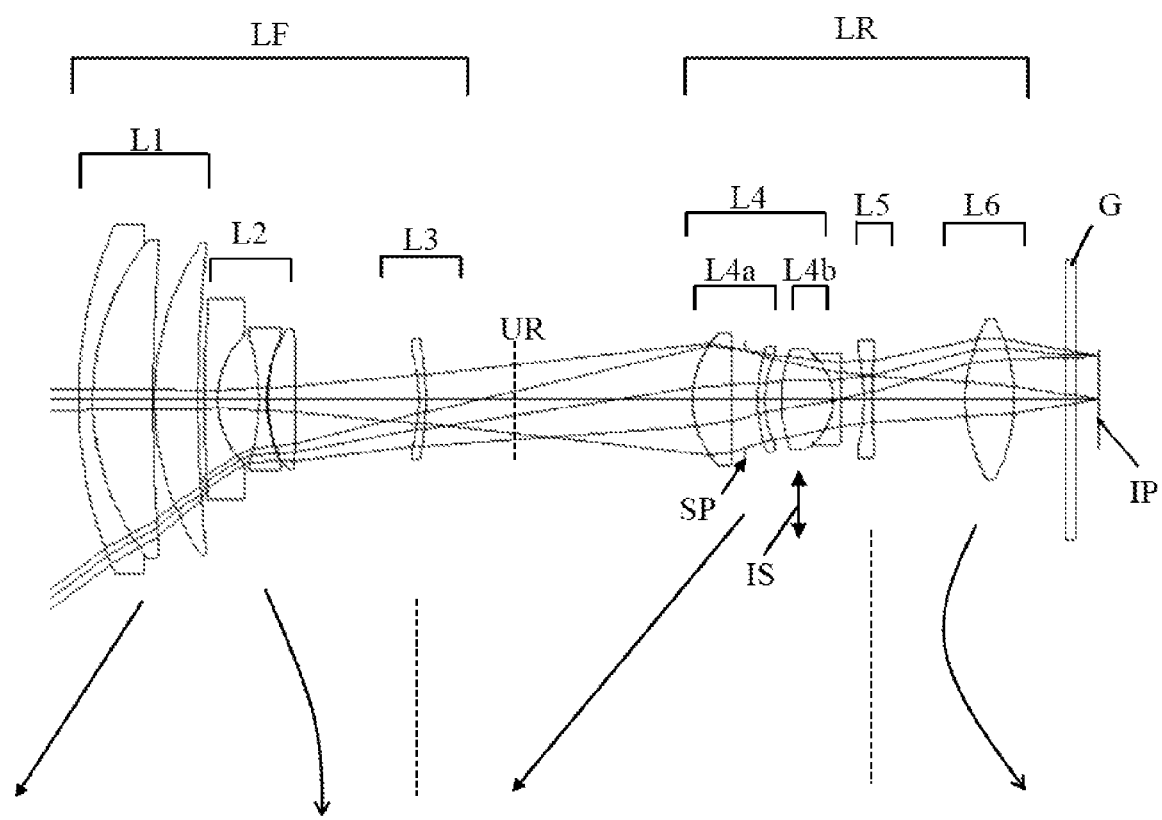
FIG. 4 is a sectional view of a zoom lens that is Embodiment 2 of the present invention at a wide-angle end, whose optical path is developed at a reflective mirror.
Figure 5A:
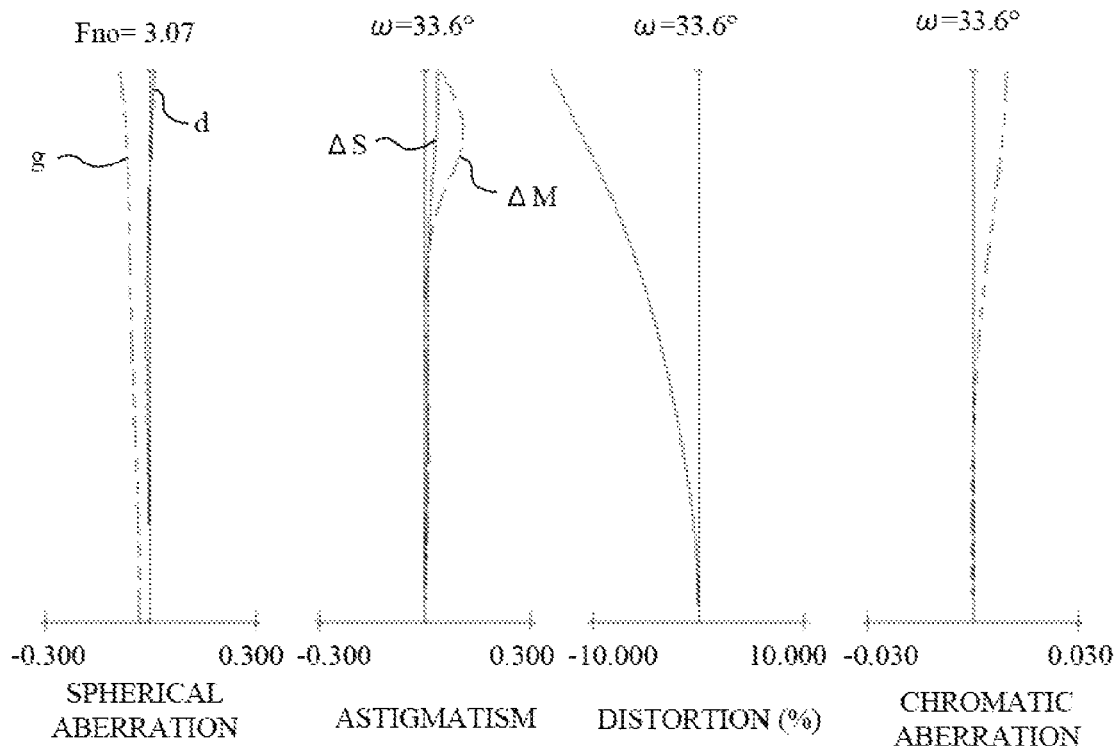
FIGS. 5A and 5B are aberration charts of the zoom lens of Embodiment 2 at the wide-angle end and at a telephoto end, respectively.
Figure 5B:
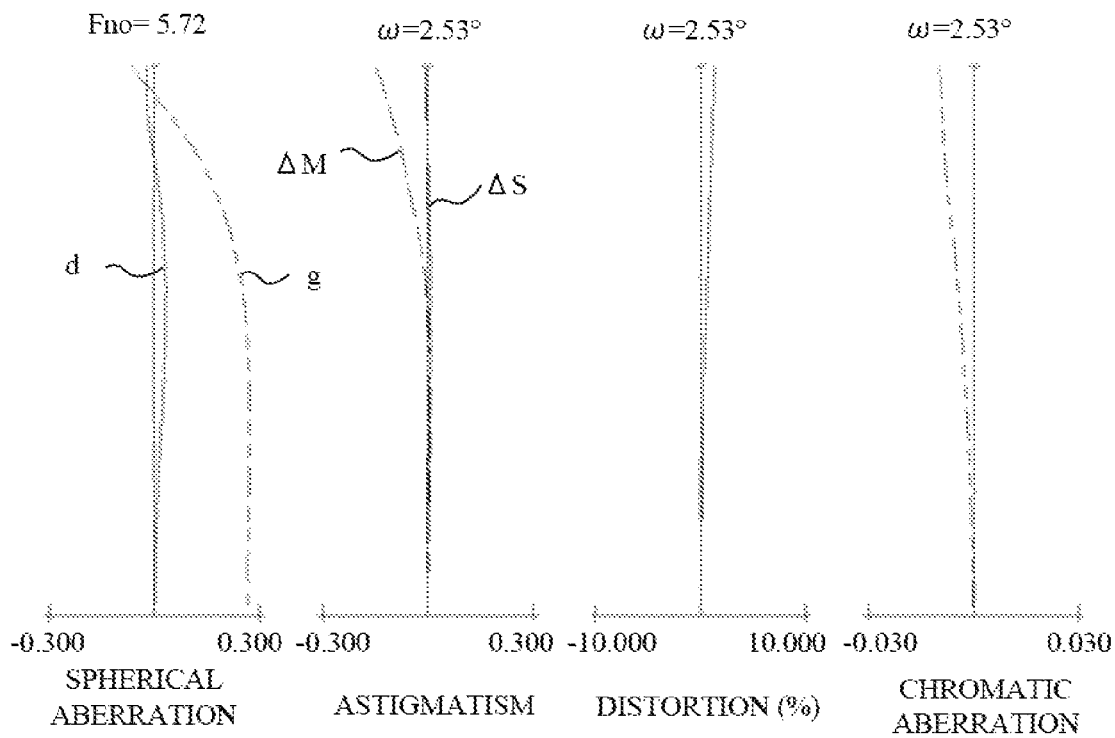
Figure 6:
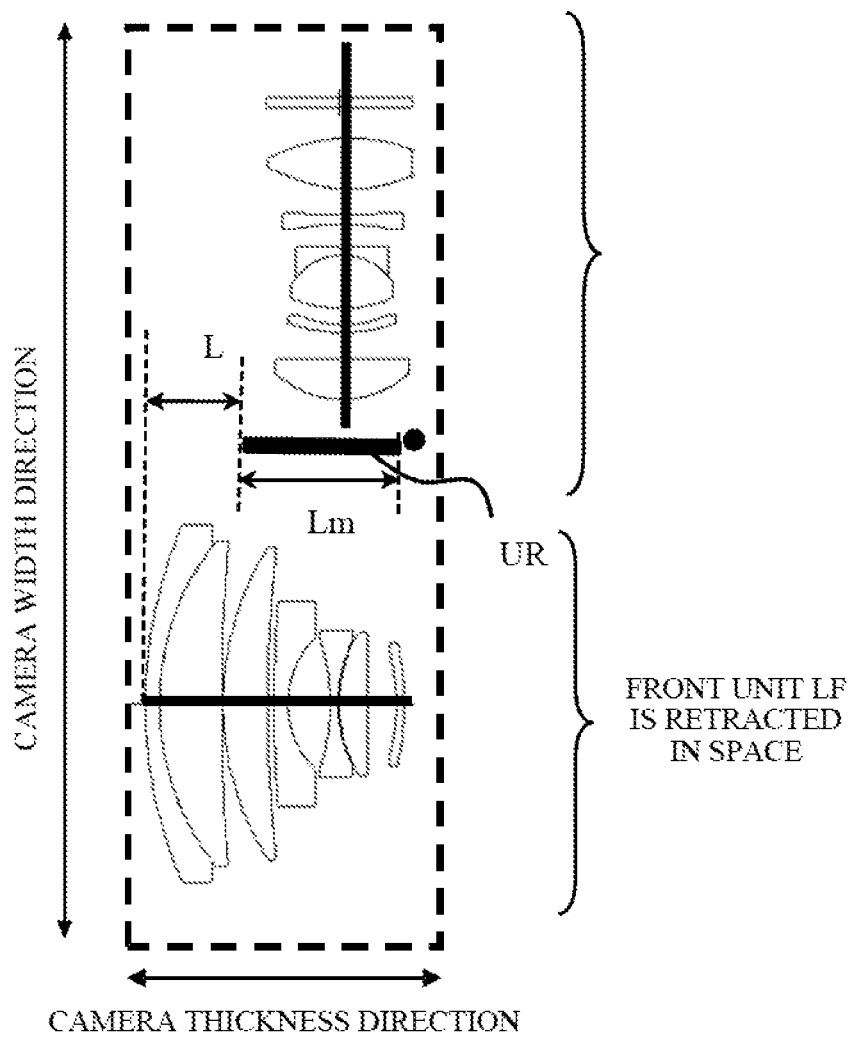
FIG. 6 shows the zoom lens of Embodiment 2 in a retracted state.

FIG. 4 shows a configuration of a zoom lens of a second embodiment (Embodiment 2) of the present invention at a wide-angle end, an optical path of the zoom lens being developed at a reflective mirror. FIGS. 5A and 5B show various aberrations of the zoom lens of Embodiment 2 at the wide-angle end and at a telephoto end, respectively. FIG. 6 shows a configuration of the zoom lens of Embodiment 2 in a non-image capturing state, the zoom lens being retracted in the camera body.

Figure 7:
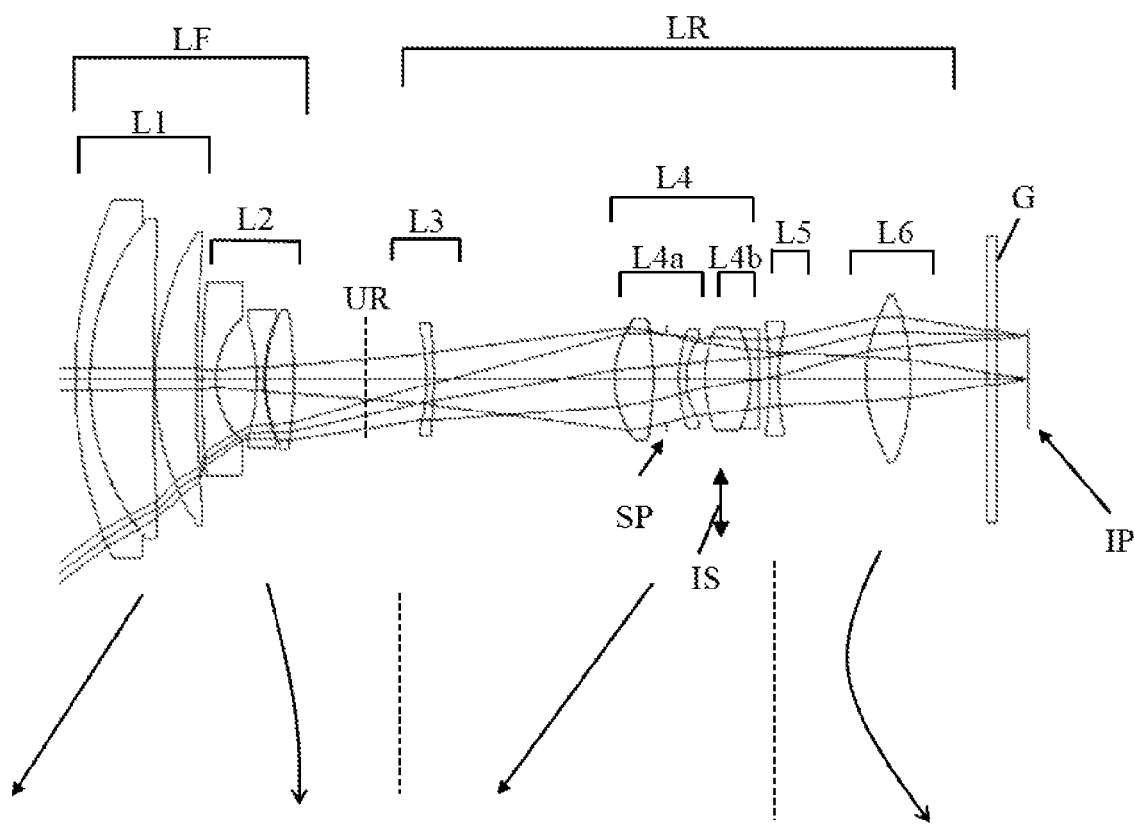
FIG. 7 is a sectional view of a zoom lens that is Embodiment 3 of the present invention at a wide-angle end, whose optical path is developed at a reflective mirror.
Figure 8A:
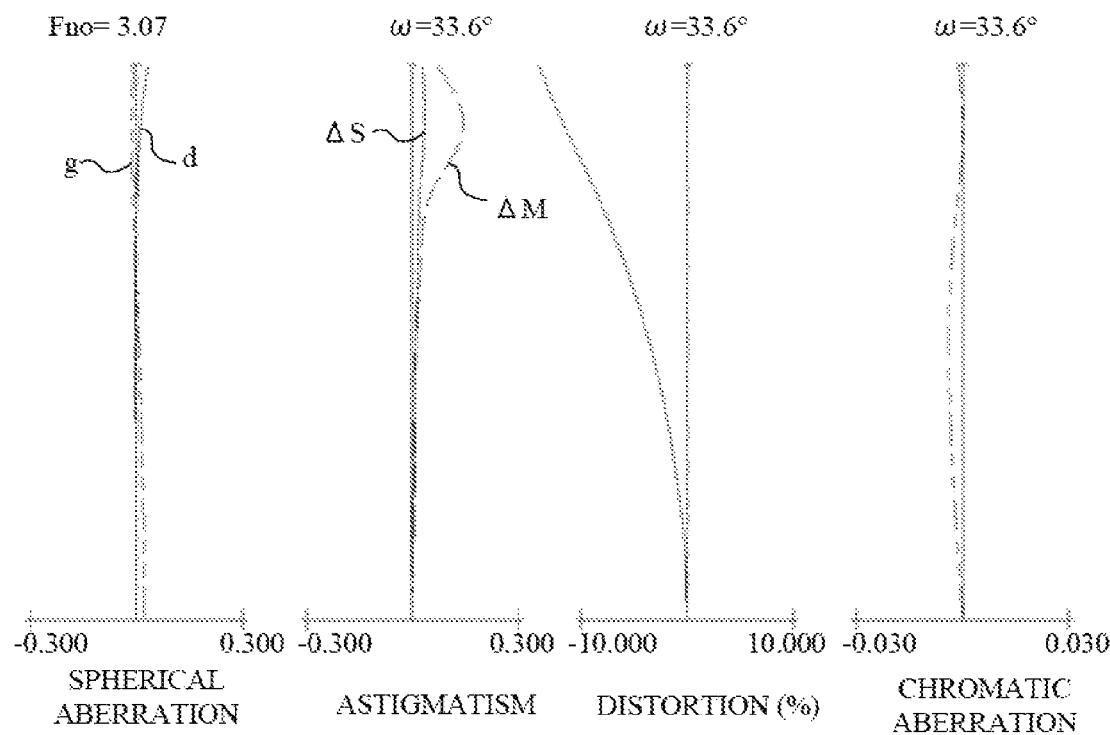
FIGS. 8A and 8B are aberration charts of the zoom lens of Embodiment 3 at the wide-angle end and at a telephoto end, respectively.
Figure 8B:
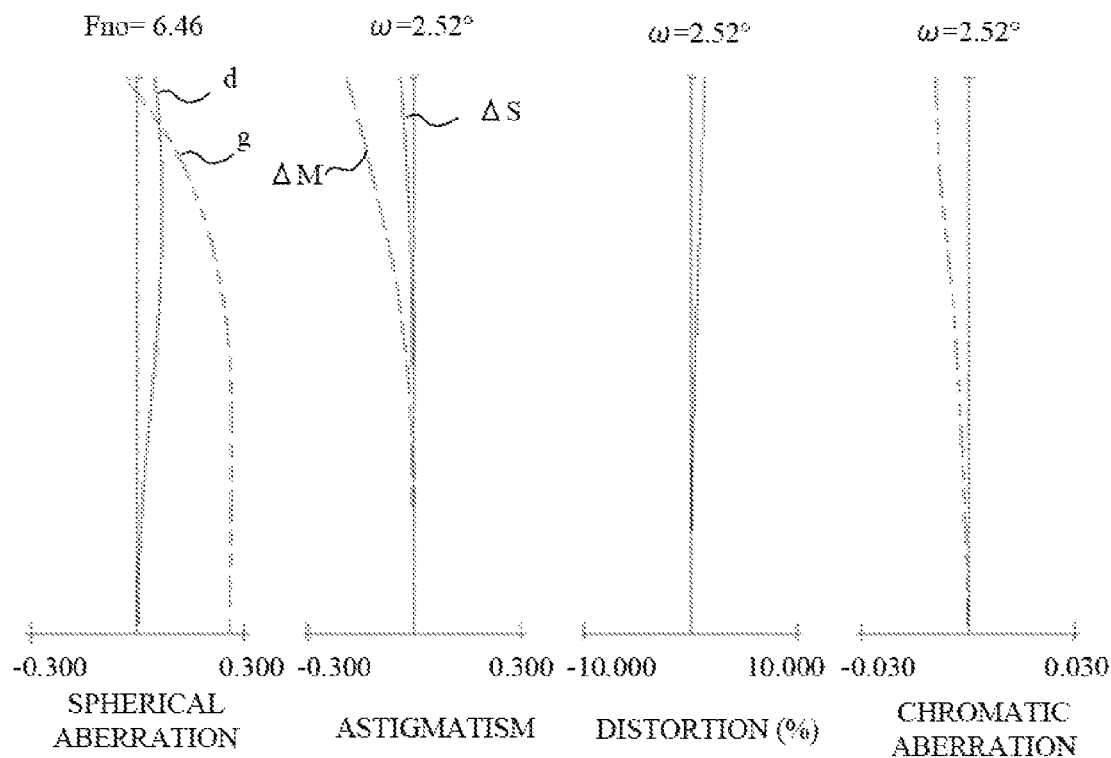
Figure 9:
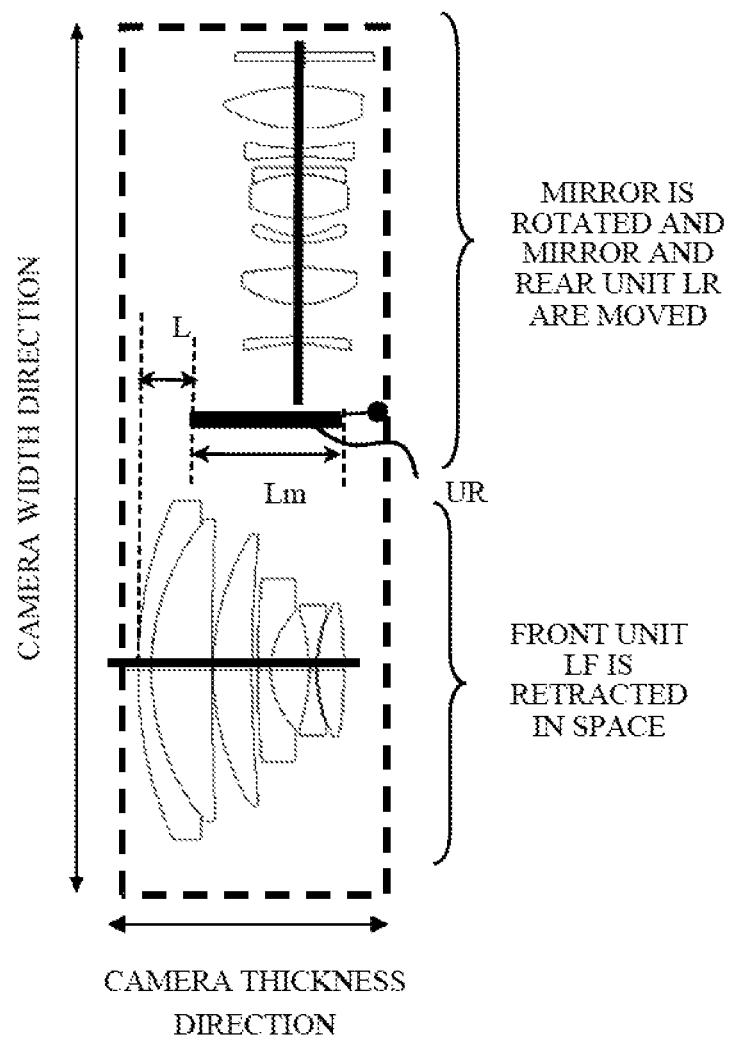
FIG. 9 shows the zoom lens of Embodiment 3 in a retracted state.

FIG. 7 shows a configuration of a zoom lens of a third embodiment (Embodiment 3) of the present invention at a wide-angle end. FIGS. 8A and 8B show various aberrations of the zoom lens of Embodiment 3 at the wide-angle end and at a telephoto end, respectively. FIG. 9 shows a configuration of the zoom lens of Embodiment 3 in a non-image capturing state, the zoom lens being retracted in the camera body.

Figure 10:
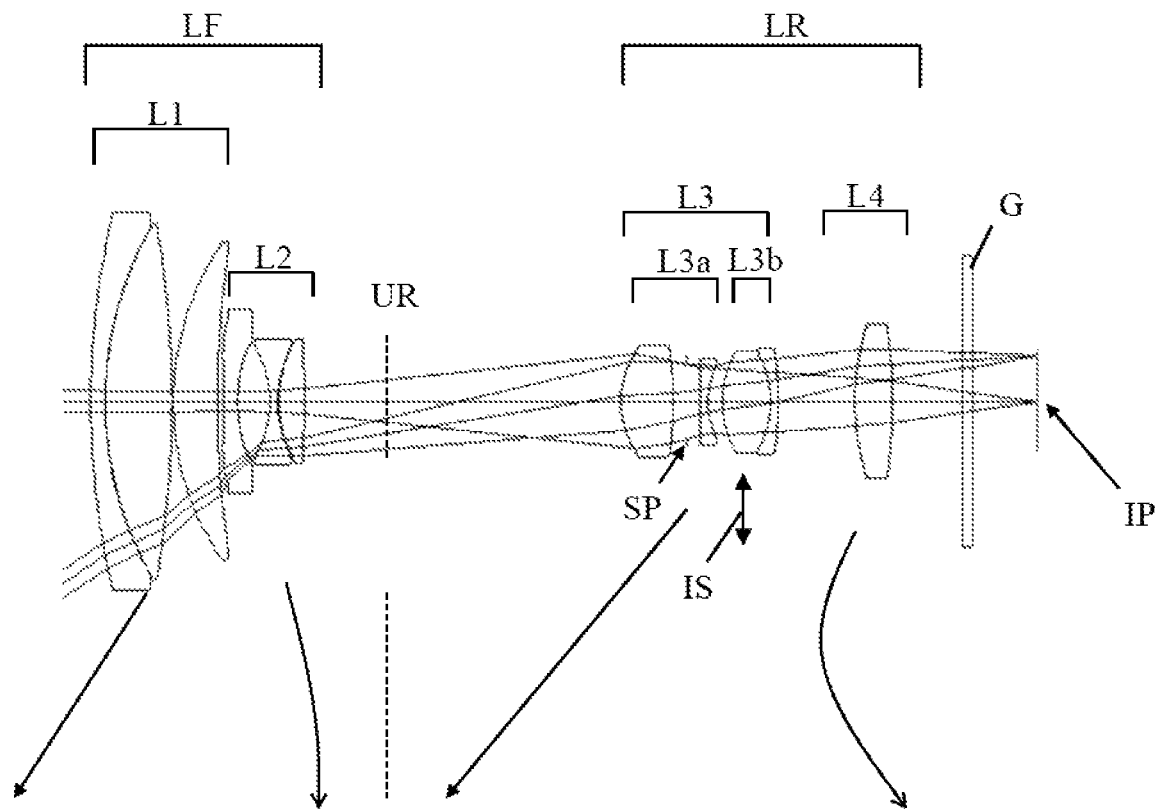
FIG. 10 is a sectional view of a zoom lens that is Embodiment 4 of the present invention at a wide-angle end, whose optical path is developed at a reflective mirror.
Figure 11A:
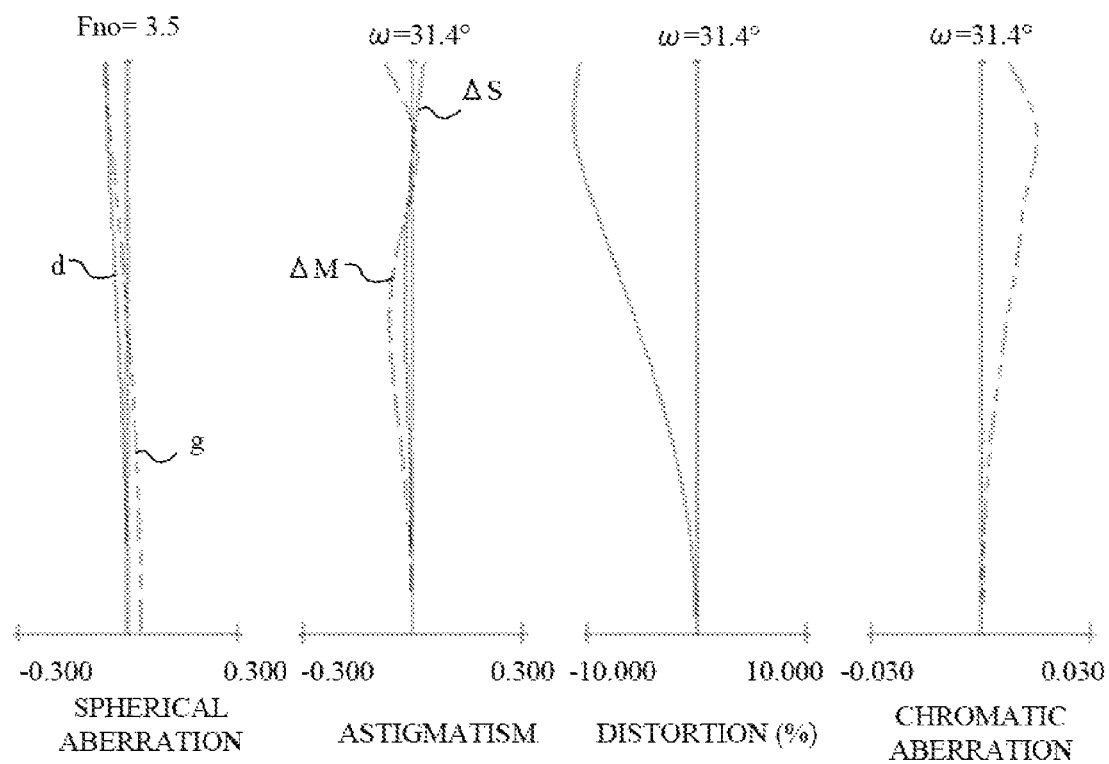
FIGS. 11A and 11B are aberration charts of the zoom lens of Embodiment 4 at the wide-angle end and at a telephoto end, respectively.
Figure 11B:
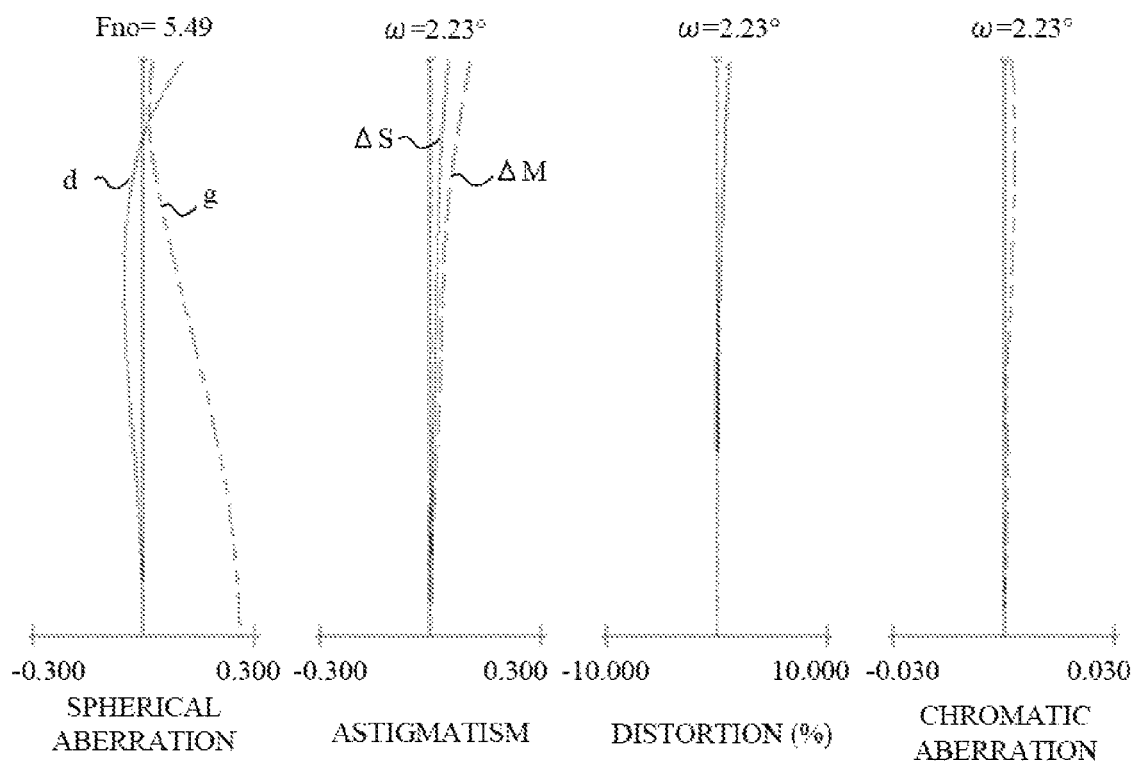
Figure 12:
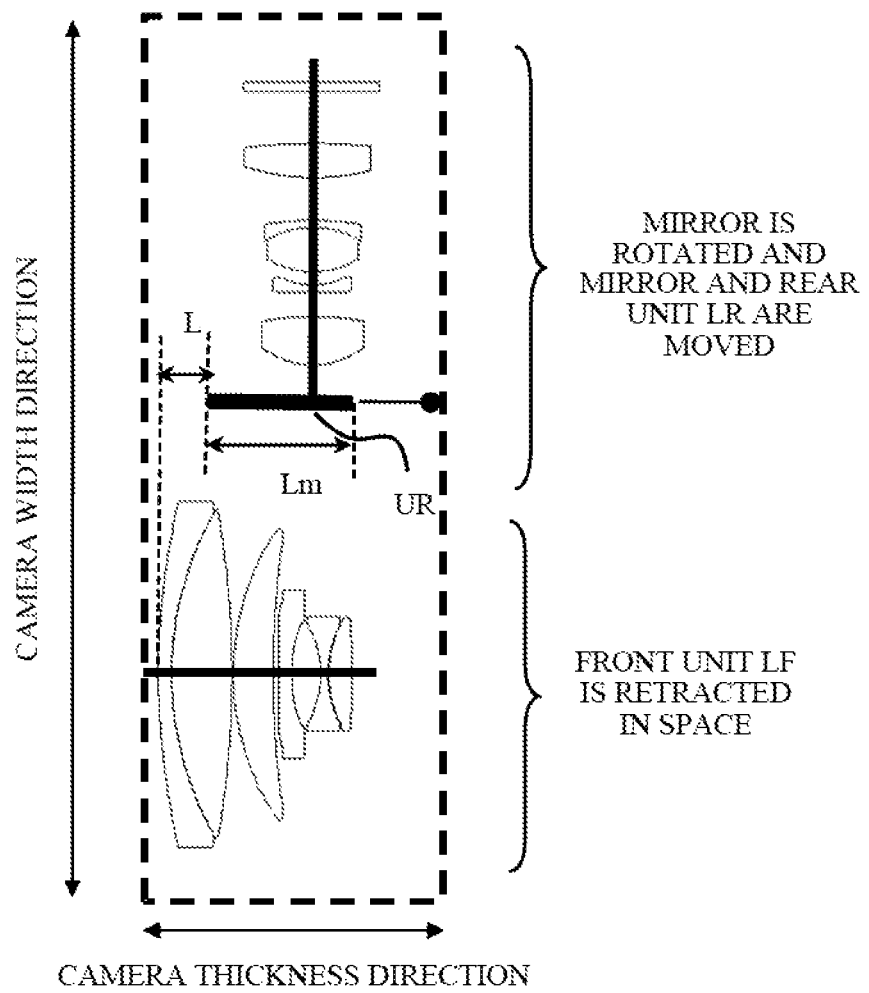
FIG. 12 shows the zoom lens of Embodiment 4 in a retracted state.

FIG. 10 shows a configuration of a zoom lens of a fourth embodiment (Embodiment 4) of the present invention at a wide-angle end. FIGS. 11A and 11B show various aberrations of the zoom lens of Embodiment 4 at the wide-angle end and at a telephoto end, respectively. FIG. 12 shows a configuration of the zoom lens of Embodiment 4 in a non-image capturing state, the zoom lens being retracted in the camera body.

Figure 13:
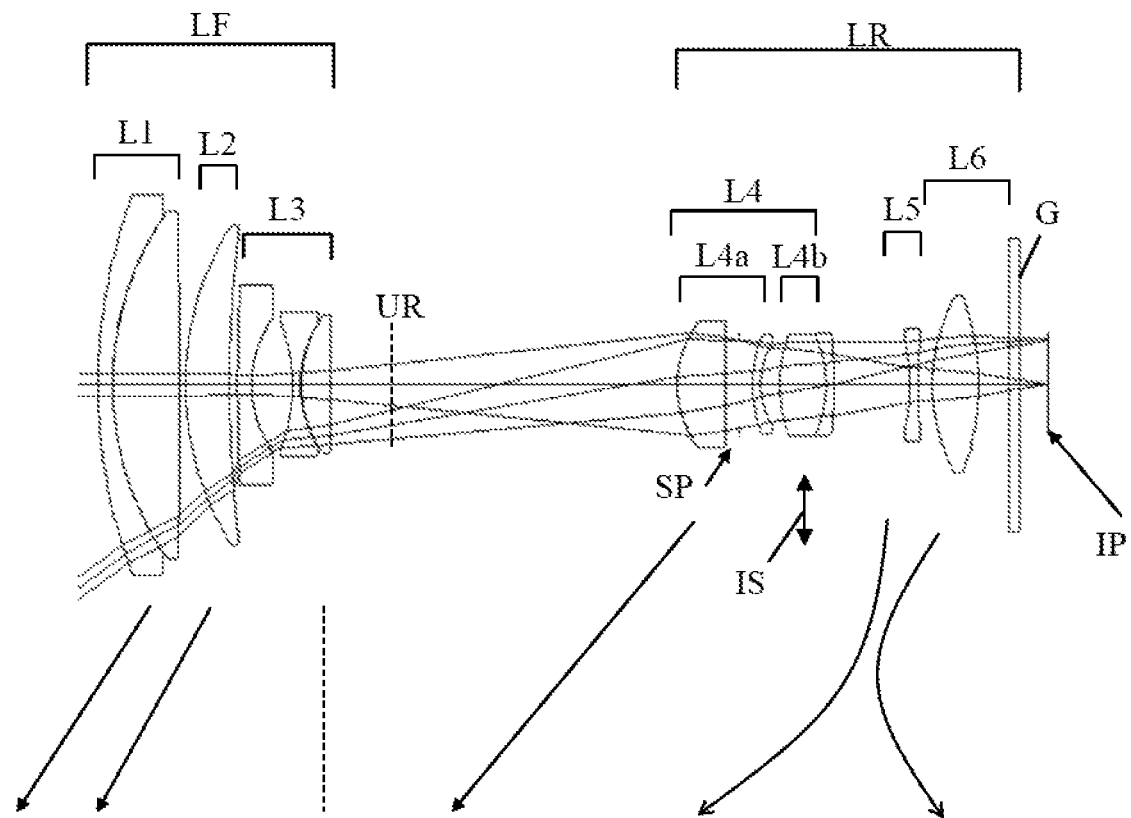
FIG. 13 is a sectional view of a zoom lens that is Embodiment 5 of the present invention at a wide-angle end, whose optical path is developed at a reflective mirror.
Figure 14A:
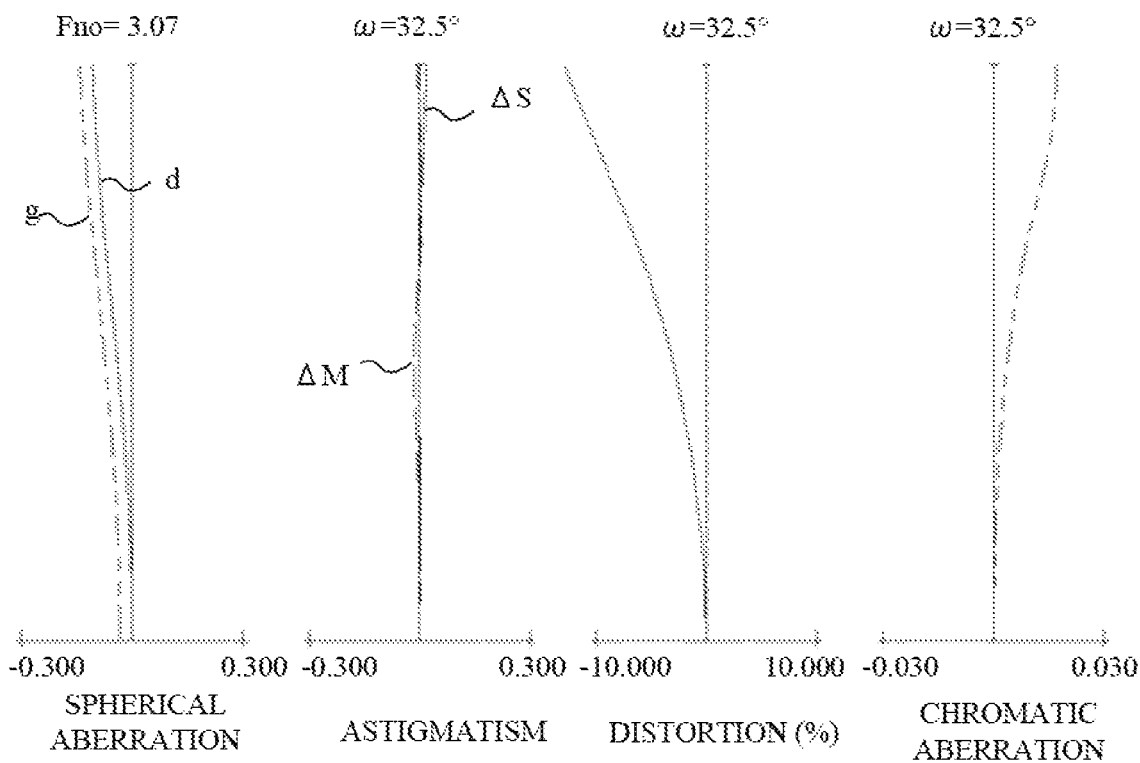
FIGS. 14A and 14B are aberration charts of the zoom lens of Embodiment 5 at the wide-angle end and at a telephoto end, respectively.
Figure 14B:
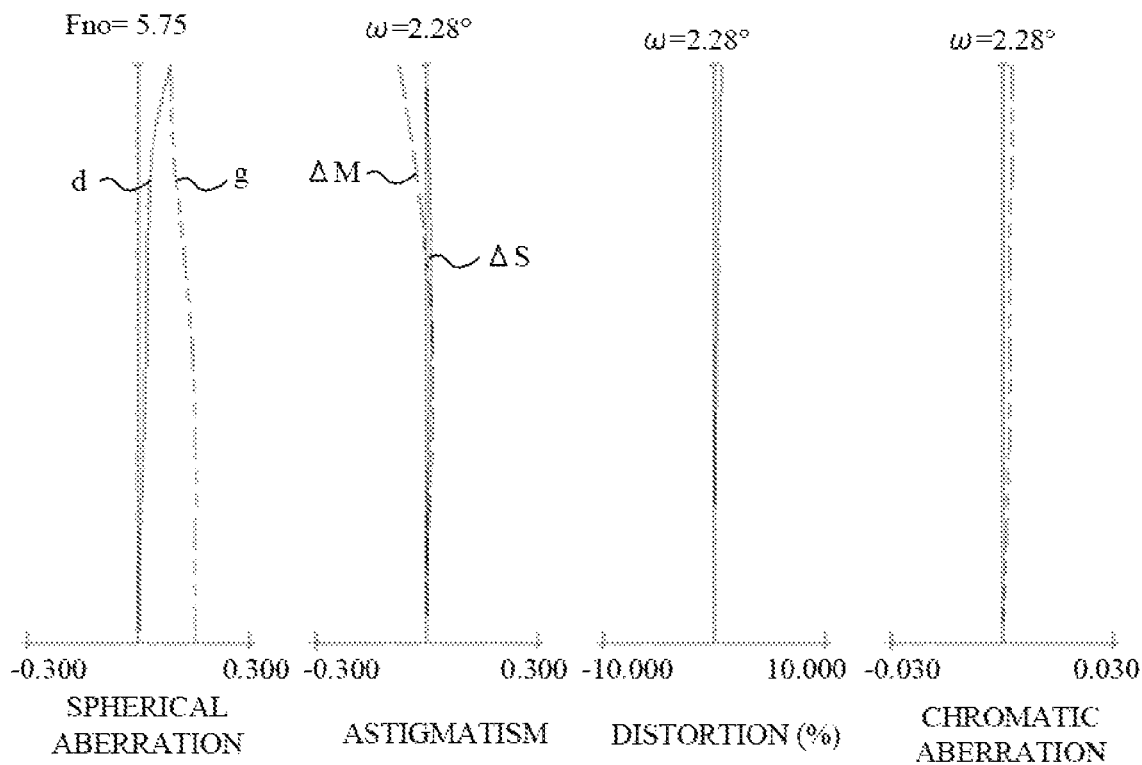
Figure 15:
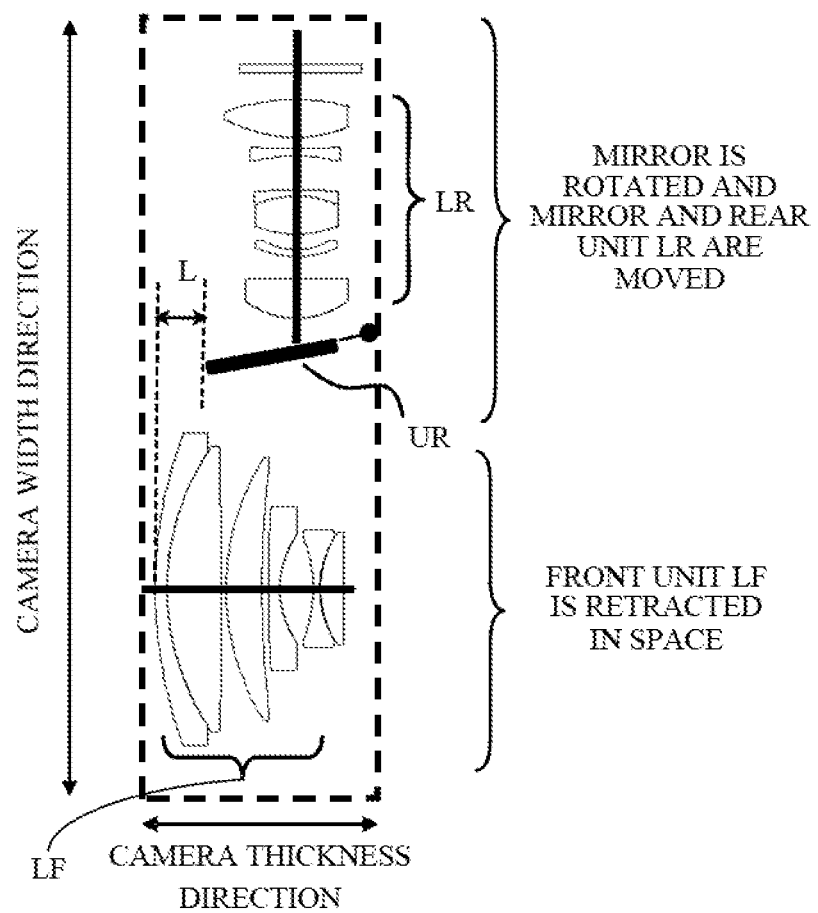
FIG. 15 shows the zoom lens of Embodiment 5 in a retracted state.

FIG. 13 shows a configuration of a zoom lens of a fifth embodiment (Embodiment 5) of the present invention at a wide-angle end. FIGS. 14A and 14B show various aberrations of the zoom lens of Embodiment 5 at the wide-angle end and at a telephoto end, respectively. FIG. 15 shows a configuration of the zoom lens of Embodiment 5 in a non-image capturing state, the zoom lens being retracted in the camera body.

Although an optical path of the actual zoom lens of each embodiment is bent by the reflective mirror, FIGS. 1, 4, 7, 10 and 13 each show the configuration of the zoom lens whose optical path is developed at the reflective mirror.

The zoom lens of each embodiment is used as an image capturing lens provided in image pickup apparatuses (hereinafter each referred to as "a camera") such as video cameras, digital still cameras and silver-haloid film cameras. In each figure showing the configuration of the zoom lens, a left side corresponds to the object side (front side), and a right side corresponds to the image side (rear side). Moreover, LF denotes the front unit including the first lens unit and the second lens unit, UR denotes the reflective mirror that bends the optical path by 90 degrees or approximately 90 degrees, and LR denotes the rear unit including the two or more lens units.

Furthermore, i represents a number counted from the object side, and Li represents an i-th lens unit. SP represents an aperture stop that limits an F-number, G represents an optical block such as an optical filter, a face plate, a quartz low-pass filter and an infrared cutting filter.

In addition, IP represents an image plane. An image pickup plane of an image sensor (photoelectric conversion element) such as a CCD sensor or a CMOS sensor is disposed at the image plane IP when the zoom lens is used as the image capturing lens for video cameras or digital still cameras. A film surface is placed at the image plane IP when the zoom lens is used as the image capturing lens for silver-haloid film cameras.

Arrows show movement loci of the respective lens units in zooming from the wide-angle end to the telephoto end. An arrow IS represents a movement direction of a lens unit when image blur due to shaking of the camera is corrected.

FIGS. 2A, 2B, 5A, 5B, 8A, 8B, 11A, 11B, 14A and 15A each show spherical aberration for a d-line, spherical aberration for a g-line, astigmatism $\Delta M$ in a meridional image plane, astigmatism $\Delta S$ in a sagittal image plane, distortion, and chromatic aberration of magnification for the g-line. In these figure, ω represents a half angle of view (half of an image capturing field angle), and Fno represents an F-number. In each embodiment, the wide-angle end and the telephoto end are zoom positions where a lens unit (or lens units) for variation of magnification is located at mechanical ends of its movable range in the direction of the optical axis (hereinafter referred to as "an optical axis direction").

In the zoom lens of each embodiment, the front unit LF includes, in order from the object side to the image side, the first lens unit L1 having a positive refractive power and the second lens unit L2 having a positive or negative refractive power. The rear unit LR includes two or more lens units. During zooming, the reflective mirror UR is not moved, while the first lens unit L1 and at least two lens units included in the two or more lens units of the rear unit LR are moved in the optical axis direction. Providing The reflection member UR which bends the light from the object side in the optical path reduces a thickness of the camera.

Moreover, in each embodiment, using the reflective mirror UR, not a reflective prism, as a reflective member to bend the optical path enables reducing width of the camera in a state where the zoom lens is retracted (hereinafter referred to as "a lens retracted state") since the reflective mirror UR can be disposed so as not to occupy a large space in the optical axis direction of the rear unit LR in the lens retracted state. In the lens retracted state, the reflective mirror UR is disposed after its rotation such that a normal line to its reflective surface (hereinafter referred to as "a reflective surface normal line") is approximately parallel to the optical axis of the rear unit LR. With the use of the reflective mirror UR, reducing magnification varying strokes of the lens units of the rear unit LR which are moved during zooming makes it possible to optically reduce the camera width. Since the magnification varying strokes of the lens units of the rear unit LR are reduced, a focal length of a lens unit having a negative refractive power whose absolute value is maximum among those of lens units included in the front unit LF disposed on the object side further than the reflective mirror UR is appropriately set so as to reduce a front lens diameter and to facilitate achievement of a desired zoom ratio.

Next, description will be made of the configuration of the zoom lens in the lens retracted state with reference to FIGS. 3A and 3B, by taking Embodiment 1 as an example. When the zoom lens is retracted into the camera body, the reflective mirror UR and the rear unit LR are moved to the image side, and the reflective mirror UR is further rotated about its rotation center (a rotation axis rotatably supporting the reflective mirror UR) such that the reflective surface normal line thereof is brought closer to parallel to the optical axis of the rear unit LR. The reflective mirror UR may be rotated about the rotation center after the movement to the image side, and may be moved to the image side after the rotation. Such rotation and movement of the reflective mirror UR and the rear unit LR enables retraction of part (one or more lens units) of the first unit LF in a partial space formed thereby in a direction of the camera width in the lens retracted state. Furthermore, since the reflective mirror UR is rotated and moved away from its position in the image capturing state to form the space where the part of the first unit LF is retracted, the thickness of the camera is reduced.

Although in FIGS. 3A and 3B both the rotation of the reflective mirror UR about the rotation axis and the movement (hereinafter referred to as "axial movement") of the reflective mirror UR in a direction parallel to the optical axis of the rear unit LR are performed when the zoom lens is retracted, it is only necessary that at least one of the rotation and the axial movement thereof be performed. For example, the reflective mirror UR may be rotated about the rotation axis to be retracted such that the reflective surface normal line is brought parallel to the optical axis of the front unit LF. Furthermore, the reflective mirror UR may be retracted in other ways than the above-mentioned ones; for example, the reflective mirror UR may be moved perpendicularly to a paper of FIGS. 3A and 3B without being moved to the image side such that the reflective surface normal line is brought approximately perpendicular to the optical axis of the front unit LF.

In each embodiment, the front unit LF is disposed on the object side further than the reflective mirror UR, and the rear unit LR is disposed on the image side further than the reflective mirror UR. The reflective mirror UR bends the optical axis from the front unit LF by approximate 90° (90±10°) to connect it to the optical axis of the rear unit LR.

In the lens retracted state shown in FIGS. 3B, 6, 9 and 12, the reflective surface normal line of the reflective mirror UR and the optical axis of the rear unit LR form an angle of 0°. In the lens retracted state shown in FIG. 15, the reflective surface normal line of the reflective mirror UR and the optical axis of the rear unit LR form an angle of 10°. The angle formed by the reflective surface normal line of the reflective mirror UR and the optical axis of the rear unit LR may be larger than 0° to some degree.

In the following description, fn represents a focal length of the above-mentioned lens unit (also referred to as "a strongest negative power lens unit") having the negative refractive power whose absolute value is maximum among those lens units each having a negative refractive power and included in the front unit LF, and ft represents a focal length of the entire zoom lens at the telephoto end. Moreover, Lm represents a length of the reflective mirror in a sectional plane (longitudinal sectional plane shown in FIGS. 3A and 3B) including the optical axes of the front and rear units LF and LR, and Lf represents a sum of optical-axis-directional thicknesses of the respective lens units included in the front unit LF. Furthermore, as shown in FIG. 3B, L represents a shorter one of lengths in the optical axis direction of the front unit LF from an apex of a most-object side lens surface of the first lens unit L1 to ends of the reflective mirror UR in the sectional plane after the zoom lens is retracted in the camera body (in the lens retracted state) as shown in FIG. 3B.

In each embodiment, the following conditions are satisfied:

$$10.5 < ft/|fn| < 30.0 \quad (1)$$

$$0.80 < (Lf-L)/Lm < 1.30 \quad (2).$$

The zoom lens in each embodiment is a positive-lead zoom lens in which a most-object side lens unit is a positive lens unit having a positive refractive power. The reflective mirror UR is not moved and the first lens unit L1 and the at least two lens units of the rear unit LR are moved, which achieves a high zoom ratio. Moreover, in the lens retracted state, the part of the front unit LF is retracted in the space formed by at least one of the rotation and axial movement of the reflective mirror UR, which achieves thinning of the camera.

Condition (1) limits a ratio of the focal length ft of the entire zoom lens at the telephoto end to the focal length (absolute value) fn of the strongest negative power lens unit of the front unit LF. A lower value of ft/|fn| than the lower limit of condition (1) excessively reduces the refractive power of the strongest negative power lens unit, which makes it difficult to achieve a high zoom ratio. A higher value of ft/|fn| than the upper limit of condition (1) excessively increases the refractive power of the strongest negative power lens unit, which particularly increases a thickness of an edge portion of each negative lens of the strongest negative power lens unit and thereby makes it difficult to reduce the camera thickness.

Condition (2) limits a relation among a total thickness of lens thicknesses of the respective lens units included in the front unit LF (each lens thickness is a length from an object side lens surface to an image side lens surface of each lens unit), a size of the reflective mirror UR and location of the reflective mirror UR. The size of the reflective mirror UR highly influences the camera thickness. A long length of the reflective mirror UR making a value of (Lf−L)/Lm lower than the lower limit of condition (2) increases the magnification varying movement stroke of the lens units included in the front unit LF, which increases the total length of the zoom lens and thereby increases the camera thickness. On the other hand, a higher value of (Lf−L)/Lm than the upper limit of condition (2) increases the total thickness of the front unit LF with respect to the size of the reflective mirror UR, which undesirably increases the camera thickness.

It is desirable to set the numerical ranges of conditions (1) and (2) as follows to achieve a more compact camera:

$$12.0 < ft/|fn| < 20.0 \tag{1a}$$

$$0.85 < (Lf-L)/Lm < 1.20 \tag{2a}$$

As described above, each embodiment satisfies the above conditions and thereby achieves a compact zoom lens having a high zoom ratio. Moreover, it is desirable to satisfy at least one of the following conditions where fr represents a focal length of a most-image side lens unit disposed at a most-image side position among the lens units included in the rear unit LR, Nn represents an average refractive index of materials of two or more negative lenses included in the strongest negative power lens unit of the front unit LF, Zf represents a variable magnification ratio of the front unit LF, Zr represents a variable magnification ratio of the rear unit LR, and α represents an angle formed between the reflective surface normal line of the reflective mirror UR and the optical axis of the rear unit LR in the lens retracted state (that is, after the zoom lens is retracted in the camera body).

$$0.10 < fr/ft < 0.40 \tag{3}$$

$$1.85 < Nn < 2.00 \tag{4}$$

$$1.50 < Zf/Zr < 6.00 \tag{5}$$

$$|\alpha| < 15° \tag{6}$$

Description will be made of technical meanings of each of conditions (3) to (6).

Condition (3) limits the focal length of the most-image side lens unit (final lens unit). The focal length of the final lens unit making a value of fr/ft lower than the lower limit of condition (3) increases a refractive power and an effective diameter of the final lens unit, which increases the camera thickness. On the other hand, a higher value of fr/ft than the upper limit of condition (3) makes it difficult to secure a sufficient variable magnification ratio by the rear unit LR, which increases a magnification varying burden of the lens units disposed on the object side further than the reflective mirror UR and increases movement amounts thereof, resulting in increase of the camera thickness.

Condition (4) limits the average refractive index of the materials of the two or more negative lenses included in the strongest negative power lens unit of the front unit LF. A lower value of Nn than the lower limit of condition (4) increases the edge portion of each negative lens, which increases the camera thickness. On the other hand, a higher value of Nn than the upper limit of condition (4) generally makes it necessary to use a high dispersion material, which makes it difficult to correct chromatic aberration and thereby makes the lens configuration complicated, resulting in increase in size of the camera.

Condition (5) limits a ratio of the variable magnification ratio of the rear unit LR to that of the front unit LF. A lower value of Zf/Zr than the lower limit of condition (5) excessively decreases a magnification varying burden of the front unit LF, which increases the camera width. On the other hand, a higher value of Zf/Zr than the upper limit of condition (5) excessively increases the magnification varying burden of the front unit LF, which makes it difficult to reduce the camera thickness.

Condition (6) limits the angle between the reflective surface normal line of the reflective mirror UR and the optical axis of the rear unit LR in the lens retracted state. A higher value of |α| than 15° increases the space occupied by the reflective mirror UR in the camera width direction in the lens retracted state, which undesirably increases the size of the camera.

It is more desirable to set the numerical ranges of conditions (3) to (6) as follows:

$$0.10 < fr/ft < 0.33 \tag{3a}$$

$$1.85 < Nn < 1.95 \tag{4a}$$

$$1.50 < Zf/Zr < 5.50 \tag{5a}$$

$$|\alpha| < 12° \tag{6a}$$

In each embodiment, as shown in FIGS. 3B, 6, 9, 12 and 15, when the zoom lens is retracted into the camera body, the reflective mirror UR is rotated about the rotation axis which rotatably supports the reflective mirror UR and is moved to the image side and thereby forms the space where the part of the front unit LF is retracted. This configuration enables, in the camera width direction, effective utilization of a space occupied by the reflective mirror UR in the image capturing state as the space for retracting the front unit LF in the lens retracted state. As mentioned above, at least one of the rotation and the perpendicular movement to the optical axis of the front unit LF (that is, the axial movement parallel to the optical axis of the rear unit LR) of the reflective mirror UR may be performed when the zoom lens is retracted into the camera body. At least one of the rotation and the perpendicular movement also enables effective utilization of the space occupied by the reflective mirror UR in the image capturing state as the space for retracting the front unit LF in the lens retracted state.

In each embodiment, one lens unit included in the rear unit LR includes in order from the object side to the image side a first sub-lens unit and a second sub-lens unit which is moved in a direction including a vertical direction component to the optical axis of the rear unit LR for moving an imaging position in directions orthogonal to the optical axis.

Some zoom lenses including a reflective mirror and having a high zoom ratio employ a configuration that moves movable lens units toward the reflective mirror in zooming from a wide-angle end to a telephoto end. In such a configuration, dividing any one of lens unit included in a rear unit LR into multiple partial lens units (sub-lens units) and moving an image-side sub lens unit thereamong in a direction including a vertical direction component to an optical axis of the rear unit LR facilitates correction of image blur due to shaking of the zoom lens (camera) while preventing interference of the lens units particularly at the telephoto end.

Next, description will be made of the lens configuration of each embodiment.

Embodiment 1

In the zoom lens of Embodiment 1 shown in FIG. 1, the front unit LF is constituted by, in order from the object side to the image side, the first lens unit L1 having the positive refractive power and the second lens unit L2 having the negative refractive power. The rear unit LR is constituted by, in order from the object side to the image side, a third lens unit L3 having a positive refractive power, a fourth lens unit L4 having a negative refractive power and a fifth lens unit L5 having a positive refractive power. The reflective mirror UR is disposed between the second lens unit L2 and the third lens unit L3.

During zooming from the wide-angle end to the telephoto end, the second lens unit L2, the reflective mirror UR and the fourth lens unit L4 are not moved. The first lens unit L1 is linearly moved to the object side or is moved so as to draw a locus convex toward the image side. The third lens unit L3 is moved to the object side. The fifth lens unit L5 is non-linearly moved to the image side in order to correct variation of the image plane IP with variation of magnification.

The zoom lens of this embodiment fixes the reflective mirror UR, the second lens unit L2 and the fourth lens unit L4 and moves the first lens unit L1, the third lens unit L3 and the fifth lens unit L5 during the zooming to achieve a high zoom ratio of approximately 13. The zoom lens of this embodiment moves the fifth lens unit L5 for focusing.

In this embodiment, the third lens unit L3 includes a first sub-lens unit L3$a$ and a second sub-lens unit L3$b$; the second sub-lens unit L3$b$ is moved in the directions orthogonal to the optical axis for correcting image blur due to the shaking of the zoom lens.

Embodiment 2

In the zoom lens of Embodiment 2 shown in FIG. 4, the front unit LF is constituted by, in order from the object side to the image side, the first lens unit L1 having the positive refractive power, the second lens unit L2 having the negative refractive power and a third lens unit L3 having a negative refractive power. The rear unit LR is constituted by, in order from the object side to the image side, a fourth lens unit L4 having a positive refractive power, a fifth lens unit L5 having a negative refractive power and a sixth lens unit L6 having a positive refractive power. The reflective mirror UR is disposed between the third lens unit L3 and the fourth lens unit L4.

During zooming from the wide-angle end to the telephoto end, the third lens unit L3, the reflective mirror UR and the fifth lens unit L5 are not moved. The first lens unit L1 is linearly moved to the object side or is moved so as to draw a locus convex toward the image side. The second lens unit L2 is moved so as to draw a locus convex toward the image side. The fourth lens unit L4 is moved to the object side. The sixth lens unit L6 is moved so as to draw a locus convex toward the object side. The zoom lens of this embodiment thus fixes the reflective mirror UR, the third lens unit L3 and the fifth lens unit L5 and moves the first lens unit L1, the second lens unit L2, the fourth lens unit L4 and the sixth lens unit L6 during the zooming to achieve a high zoom ratio of approximately 15. The zoom lens of this embodiment moves the sixth lens unit L6 for focusing.

In this embodiment, the fourth lens unit L4 includes a first sub-lens unit L4$a$ and a second sub-lens unit L4$b$; the second sub-lens unit L4$b$ is moved in the directions orthogonal to the optical axis for correcting image blur due to the shaking of the zoom lens. Other configurations are identical to those in Embodiment 1.

Embodiment 3

In the zoom lens of Embodiment 3 shown in FIG. 7, the front unit LF is constituted by, in order from the object side to the image side, the first lens unit L1 having the positive refractive power and the second lens unit L2 having the negative refractive power. The rear unit LR is constituted by, in order from the object side to the image side, a third lens unit L3 having a negative refractive power, a fourth lens unit L4 having a positive refractive power, a fifth lens unit L5 having a negative refractive power and a sixth lens unit L6 having a positive refractive power. The reflective mirror UR is disposed between the second lens unit L2 and the third lens unit L3.

During zooming from the wide-angle end to the telephoto end, the reflective mirror UR, the third lens unit L3 and the fifth lens unit L5 are not moved. The first lens unit L1, the second lens unit L2, the fourth lens unit L4 and the sixth lens unit L6 are moved similarly to those in Embodiment 2. The zoom lens of this embodiment thus fixes the reflective mirror UR, the third lens unit L3 and the fifth lens unit L5 and moves the first lens unit L1, the second lens unit L2, the fourth lens unit L4 and the sixth lens unit L6 during the zooming to achieve a high zoom ratio of approximately 15. The zoom lens of this embodiment moves the sixth lens unit L6 for focusing.

In this embodiment, the fourth lens unit L4 includes a first sub-lens unit L4$a$ and a second sub-lens unit L4$b$; the second sub-lens unit L4$b$ is moved in the directions orthogonal to the optical axis for correcting image blur due to the shaking of the zoom lens. Other configurations are identical to those in Embodiment 1.

Embodiment 4

In the zoom lens of Embodiment 4 shown in FIG. 10, the front unit LF is constituted by, in order from the object side to the image side, the first lens unit L1 having the positive refractive power and the second lens unit L2 having the negative refractive power. The rear unit LR is constituted by, in order from the object side to the image side, a third lens unit L3 having a positive refractive power and a fourth lens unit L4 having a positive refractive power. The reflective mirror UR is disposed between the second lens unit L2 and the third lens unit L3.

During zooming from the wide-angle end to the telephoto end, the reflective mirror UR is not moved. The first lens unit L1 is linearly moved to the object side or is moved so as to draw a locus convex toward the image side. The second lens unit L2 is moved so as to draw a locus convex toward the image side. The third lens unit L3 is moved to the object side. The fourth lens unit L4 is moved so as to draw a locus convex toward the object side. The zoom lens of this embodiment thus fixes the reflective mirror UR and moves the first lens unit L1, the second lens unit L2, the third lens unit L3 and the fourth lens unit L4 during the zooming to achieve a high zoom ratio of approximately 16. The zoom lens of this embodiment moves the fourth lens unit L4 for focusing.

In this embodiment, the third lens unit L3 includes a first sub-lens unit L3$a$ and a second sub-lens unit L3$b$; the second sub-lens unit L3$b$ is moved in the directions orthogonal to the optical axis for correcting image blur due to the shaking of the zoom lens. Other configurations are identical to those in Embodiment 1.

Embodiment 5

In the zoom lens of Embodiment 5 shown in FIG. 13, the front unit LF is constituted by, in order from the object side to the image side, the first lens unit L1 having the positive refractive power, the second lens unit L2 having the positive refractive power and a third lens unit L3 having a negative refractive power. The rear unit LR is constituted by, in order from the object side to the image side, a fourth lens unit L4 having a positive refractive power, a fifth lens unit L5 having a negative refractive power and a sixth lens unit L6 having a positive refractive power. The reflective mirror UR is disposed between the third lens unit L3 and the fourth lens unit L4.

During zooming from the wide-angle end to the telephoto end, the third lens unit L3 and the reflective mirror UR are not moved. The first lens unit L1, the second lens unit L2 and the fourth lens unit L4 are moved to the object side. The fifth lens unit L5 is moved so as to draw a locus convex toward the image side. The sixth lens unit L6 is moved as to draw a locus convex toward the object side. The zoom lens of this embodiment thus fixes the reflective mirror UR and the third lens unit L3 and moves the first lens unit L1, the second lens unit L2, the fourth lens unit L4, the fifth lens unit L5 and the sixth lens unit L6 during the zooming to achieve a high zoom ratio of approximately 16. The zoom lens of this embodiment moves the sixth lens unit L6 for focusing.

In this embodiment, the fourth lens unit L4 includes a first sub-lens unit L4a and a second sub-lens unit L4b; the second sub-lens unit L4b is moved in the directions orthogonal to the optical axis for correcting image blur due to the shaking of the zoom lens. Other configurations are identical to those in Embodiment 1.

The zoom lens configurations of Embodiments 1 to 5 are merely examples, and therefore other zoom lens configurations may be employed. In each embodiment, an aperture diameter of the aperture stop SP may be controlled to reduce variation of the F-number with the zooming. Moreover, distortion aberration may be electrically corrected when the zoom lens is used in an image pickup apparatus provided with an image sensor that photoelectrically converts an object image formed on its light-receiving surface by the zoom lens.

Specific numerical data of Numerical Examples 1 to 5 respectively corresponding to Embodiments 1 to 5 are shown below. In the data, i denotes a number of each surface counted from the object side, ri denotes a curvature radius of the i-th surface (optical surface), di denotes an axial distance between the i-th surface and an (i+1)-th surface, and ndi and vdi respectively denote a refractive index and an Abbe number of a material of an i-th optical element for the d-line. An aspheric shape is expressed by the following expression where k represents an eccentricity, x represents a displacement amount from a surface apex in the optical axis direction at a height h from an optical axis, R represent a paraxial curvature radius, and A4, A6, A8 and A10 represent aspheric coefficients.

$$x=(h^2/R)/\{1+[1-(1+k)\times(h/R)^2]^{1/2}\}+A4\times h^4+A6\times h^6+A8\times h^8+A10\times h^{10}$$

In addition, "E±Z" in each aspheric coefficient means "×10±Z". In the data, the last two surfaces are object-side and image-side surfaces of the optical block such as a filter and a face plate. Moreover, a back focus (BF) represents a distance from the image-side surface (final surface) of the optical block to the image plane. A total lens length is a distance from the most-object side surface to the final surface added with the back focus. Table 1 shows relations between the above-described conditions and Numerical Examples 1 to 5.

Numerical Example 1

| Unit mm | | | | | |
|---|---|---|---|---|---|
| Surface data | | | | | |
| Surface No. | r | d | nd | vd | Effective diameter |
| 1 | 36.280 | 1.10 | 1.84666 | 23.8 | 27.32 |
| 2 | 22.075 | 5.00 | 1.49700 | 81.5 | 25.18 |
| 3 | 3819.484 | 0.10 | | | 24.91 |
| 4 | 21.953 | 3.40 | 1.71300 | 53.9 | 23.62 |
| 5 | 83.784 | (Variable) | | | 23.08 |
| 6 | 67.363 | 1.05 | 1.84954 | 40.1 | 12.55 |
| 7* | 7.239 | 2.86 | | | 9.23 |
| 8 | −11.608 | 0.60 | 1.88300 | 40.8 | 8.77 |
| 9 | 8.601 | 0.19 | | | 8.49 |
| 10 | 9.629 | 2.04 | 1.94595 | 18.0 | 8.57 |
| 11 | −92.242 | 4.80 | | | 8.51 |
| 12 | ∞ | (Variable) | | | 11.31 |
| 13* | 8.197 | 2.52 | 1.55332 | 71.7 | 7.44 |
| 14* | −83.098 | 1.00 | | | 6.92 |
| 15(SP) | ∞ | 1.00 | | | 6.31 |
| 16 | 9.731 | 0.60 | 1.84666 | 23.8 | 6.32 |
| 17 | 6.137 | 1.40 | | | 6.05 |
| 18 | 10.932 | 3.42 | 1.54814 | 45.8 | 6.63 |
| 19 | −10.241 | 0.60 | 1.80610 | 33.3 | 6.53 |
| 20 | −44.165 | (Variable) | | | 6.65 |
| 21 | −16.021 | 0.70 | 1.77250 | 49.6 | 7.60 |
| 22 | 232.382 | (Variable) | | | 7.91 |
| 23* | 14.352 | 3.61 | 1.48749 | 70.2 | 11.05 |
| 24 | −13.063 | (Variable) | | | 11.19 |
| 25 | ∞ | 0.80 | 1.51633 | 64.1 | 20.00 |
| 26 | ∞ | 2.37 | | | 20.00 |
| IP | ∞ | | | | |

| Aspheric surface data |
|---|

7th surface

K = −2.66260e−001 A 4 = 1.25506e−004 A 6 = −1.40891e−005
A 8 = 1.00423e−006 A10 = −2.39914e−008

13th surface

K = −2.33750e−001 A 4 = −3.57071e−005 A 6 = −1.50723e−006
A 8 = 1.80588e−008

14th surface

K = 0.00000e+000 A 4 = 4.19704e−005

23th surface

K = 0.00000e+000 A 4 = −2.08667e−004 A 6 = 1.38190e−006
A 8 = −2.20568e−008

| Various data zoom ratio 12.75 | | | |
|---|---|---|---|
| | Wide | Middle | Tele |
| focal length | 5.18 | 22.00 | 66.05 |
| F-number | 3.07 | 4.67 | 6.42 |
| half angle of view (°) | 33.59 | 8.89 | 2.98 |
| Image height | 3.44 | 3.44 | 3.44 |
| Total lens length | 72.08 | 82.71 | 88.34 |
| BF | 2.37 | 2.37 | 2.37 |
| d 5 | 0.50 | 11.14 | 16.87 |
| d12 | 18.28 | 6.91 | 4.30 |
| d20 | 1.36 | 12.73 | 15.29 |
| d22 | 4.68 | 5.05 | 10.75 |
| d24 | 8.10 | 7.72 | 1.97 |
| Entrance pupil | 17.46 | 59.48 | 143.60 |
| Exit pupil | −61.28 | 152.44 | 38.52 |
| Front principal point | 22.22 | 84.71 | 330.31 |
| Rear principal point | −2.81 | −19.63 | −63.68 |

Zoom lens unit data

| Lens unit | Start surface | Focal length | Unit length | Front principal point | Rear principal point |
|---|---|---|---|---|---|
| 1 | 1 | 32.00 | 9.59 | 2.33 | −3.75 |
| 2 | 6 | −5.41 | 11.54 | 1.45 | −8.21 |
| 3 | 13 | 14.26 | 10.55 | 0.39 | −7.75 |
| 4 | 21 | −19.38 | 0.70 | 0.03 | −0.37 |
| 5 | 23 | 14.66 | 3.61 | 1.33 | −1.21 |
| GB | 25 | ∞ | 0.80 | 0.26 | −0.26 |

Unit mm

Lens element data

| lens | Start surface | Focal length |
|---|---|---|
| 1 | 1 | −69.04 |
| 2 | 2 | 44.66 |
| 3 | 4 | 40.79 |
| 4 | 6 | −9.62 |
| 5 | 8 | −5.52 |
| 6 | 10 | 9.31 |
| 7 | 13 | 13.62 |
| 8 | 16 | −21.25 |
| 9 | 18 | 10.23 |
| 10 | 19 | −16.67 |
| 11 | 21 | −19.38 |
| 12 | 23 | 14.66 |
| 13 | 25 | 0.00 |

Numerical Example 2

Unit mm

Surface data

| Surface No. | r | d | nd | vd | Effective diameter |
|---|---|---|---|---|---|
| 1 | 34.288 | 1.10 | 1.84666 | 23.8 | 26.50 |
| 2 | 20.047 | 4.76 | 1.49700 | 81.5 | 24.13 |
| 3 | 157.849 | 0.10 | | | 23.92 |
| 4 | 22.449 | 3.42 | 1.77250 | 49.6 | 23.37 |
| 5 | 106.336 | (Variable) | | | 22.91 |
| 6 | 102.105 | 1.05 | 1.84954 | 40.1 | 14.07 |
| 7* | 7.207 | 3.24 | | | 10.15 |
| 8 | −17.054 | 0.60 | 1.88300 | 40.8 | 9.85 |
| 9 | 10.643 | 0.10 | | | 9.63 |
| 10 | 10.710 | 2.17 | 1.94595 | 18.0 | 9.74 |
| 11 | −238.729 | (Variable) | | | 9.62 |
| 12 | −14.788 | 0.60 | 1.48749 | 70.2 | 8.13 |
| 13 | −22.527 | 4.50 | | | 8.21 |
| 14 | ∞ | (Variable) | | | 11.31 |
| 15* | 7.500 | 3.13 | 1.55332 | 71.7 | 9.00 |
| 16* | −67.550 | 1.00 | | | 8.33 |
| 17(SP) | ∞ | 1.00 | | | 7.59 |
| 18 | 12.503 | 0.60 | 1.84666 | 23.8 | 7.17 |
| 19 | 8.424 | 1.27 | | | 6.82 |
| 20 | 10.570 | 4.08 | 1.58144 | 40.8 | 6.74 |
| 21 | −4.614 | 0.60 | 1.80610 | 33.3 | 6.06 |
| 22 | 69.938 | (Variable) | | | 6.05 |
| 23 | −17.595 | 0.70 | 1.77250 | 49.6 | 7.67 |
| 24 | 46.227 | (Variable) | | | 8.03 |
| 25* | 10.257 | 3.89 | 1.48749 | 70.2 | 11.13 |
| 26 | −13.610 | (Variable) | | | 11.23 |
| 27 | ∞ | 0.80 | 1.51633 | 64.1 | 20.00 |
| 28 | ∞ | 1.84 | | | 20.00 |
| IP | ∞ | | | | |

Unit mm

Aspheric surface data

7th surface

K = 2.79987e−001 A 4 = −5.35367e−005 A 6 = −4.45027e−006
A 8 = 1.59055e−008 A10 = 1.04575e−009

15th surface

K = −1.05117e−001 A 4 = 6.36084e−006 A 6 = −8.64819e−007
A 8 = 2.26861e−008

16th surface

K = −1.79154e+002 A 4 = 1.43988e−004

25th surface

K = 0.00000e+000 A 4 = −2.86643e−004 A 6 = 5.74087e−007
A 8 = −2.33846e−008

Various data
zoom ratio 15.03

| | Wide | Middle | Tele |
|---|---|---|---|
| focal length | 5.18 | 25.00 | 77.84 |
| F-number | 3.07 | 4.33 | 5.72 |
| Half angle of view (°) | 33.59 | 7.83 | 2.53 |
| Image height | 3.44 | 3.44 | 3.44 |
| Total lens length | 80.30 | 83.31 | 88.34 |
| BF | 1.84 | 1.84 | 1.84 |
| d 5 | 0.50 | 11.63 | 17.50 |
| d11 | 9.71 | 1.54 | 0.80 |
| d14 | 16.47 | 6.55 | 4.30 |
| d22 | 1.79 | 11.71 | 13.97 |
| d24 | 7.29 | 2.43 | 8.71 |
| d26 | 3.98 | 8.90 | 2.51 |
| Entrance pupil | 18.09 | 63.98 | 164.63 |
| Exit pupil | 252.96 | −261.06 | 33.94 |
| Front principal point | 23.38 | 86.61 | 431.14 |
| Rear principal point | −3.34 | −23.16 | −76.01 |

Zoom lens unit data

| Lens unit | Start surface | Focal length | Unit length | Front principal point | Rear principal point |
|---|---|---|---|---|---|
| 1 | 1 | 32.16 | 9.38 | 2.30 | −3.59 |
| 2 | 6 | −6.16 | 7.16 | 1.31 | −3.84 |
| 3 | 12 | −90.61 | 5.10 | −0.79 | −5.70 |
| 4 | 15 | 13.48 | 11.68 | −4.04 | −9.41 |
| 5 | 23 | −16.42 | 0.70 | 0.11 | −0.28 |
| 6 | 25 | 12.67 | 3.89 | 1.19 | −1.57 |
| GB | 27 | ∞ | 0.80 | 0.26 | −0.26 |

Lens element data

| lens | Start surface | Focal length |
|---|---|---|
| 1 | 1 | −59.11 |
| 2 | 2 | 45.68 |
| 3 | 4 | 36.19 |
| 4 | 6 | −9.17 |
| 5 | 8 | −7.35 |
| 6 | 10 | 10.88 |
| 7 | 12 | −90.61 |
| 8 | 15 | 12.38 |
| 9 | 18 | −32.71 |
| 10 | 20 | 6.13 |
| 11 | 21 | −5.35 |
| 12 | 23 | −16.42 |
| 13 | 25 | 12.67 |
| 14 | 27 | 0.00 |

Numerical Example 3

Unit mm

Surface data

| Surface No. | r | d | nd | vd | Effective diameter |
|---|---|---|---|---|---|
| 1 | 34.092 | 1.10 | 1.84666 | 23.8 | 26.50 |
| 2 | 19.352 | 4.94 | 1.49700 | 81.5 | 23.60 |
| 3 | 245.625 | 0.10 | | | 22.28 |
| 4 | 21.016 | 3.15 | 1.77250 | 49.6 | 21.39 |
| 5 | 103.274 | (Variable) | | | 20.94 |
| 6 | 86.233 | 1.05 | 1.84954 | 40.1 | 13.35 |
| 7* | 6.606 | 3.12 | | | 9.44 |
| 8 | −15.055 | 0.60 | 2.00000 | 40.0 | 9.19 |
| 9 | 12.951 | 0.10 | | | 9.19 |
| 10 | 12.063 | 2.16 | 1.94595 | 18.0 | 9.38 |
| 11 | −35.833 | (Variable) | | | 9.36 |
| 12 | ∞ | 4.96 | | | 11.31 |
| 13 | −15.308 | 0.60 | 1.51633 | 64.1 | 7.42 |
| 14 | −41.341 | (Variable) | | | 7.49 |
| 15* | 7.569 | 2.96 | 1.55332 | 71.7 | 8.11 |
| 16* | −24.486 | 1.00 | | | 7.63 |
| 17(SP) | ∞ | 1.00 | | | 6.80 |
| 18 | 10.632 | 0.60 | 1.84666 | 23.8 | 6.59 |
| 19 | 5.868 | 1.41 | | | 6.23 |
| 20 | 9.638 | 3.56 | 1.60342 | 38.0 | 6.83 |
| 21 | −9.408 | 0.60 | 1.80610 | 33.3 | 6.54 |
| 22 | 715.065 | (Variable) | | | 6.55 |
| 23 | −30.828 | 0.70 | 1.77250 | 49.6 | 7.48 |
| 24 | 19.534 | (Variable) | | | 7.68 |
| 25* | 10.933 | 3.46 | 1.48749 | 70.2 | 11.39 |
| 26 | −16.828 | (Variable) | | | 11.34 |
| 27 | ∞ | 0.80 | 1.51633 | 64.1 | 20.00 |
| 28 | ∞ | 2.40 | | | 20.00 |
| IP | ∞ | | | | |

Aspheric surface data

7th surface

K = 4.95519e−001 A 4 = −1.74245e−004 A 6 = −9.87660e−006
A 8 = 2.61017e−007 A10 = −1.56231e−008

15th surface

K = −4.55464e−001 A 4 = −1.03451e−004 A 6 = −5.23921e−007
A 8 = −2.56549e−009

16th surface

K = −1.42480e−001 A 4 = 1.02387e−004

25th surface

K = 0.00000e+000 A 4 = −1.56104e−004 A 6 = 1.29154e−007
A 8 = −8.67868e−009

Various data
zoom ratio 15.10

| | Wide | Middle | Tele |
|---|---|---|---|
| focal length | 5.18 | 22.00 | 78.22 |
| F-number | 3.07 | 4.84 | 6.46 |
| half angle of view (°) | 33.59 | 8.89 | 2.52 |
| Image height | 3.44 | 3.44 | 3.44 |
| Total lens length | 73.49 | 81.72 | 88.34 |
| BF | 2.40 | 2.40 | 2.40 |
| d 5 | 0.50 | 9.20 | 15.87 |
| d11 | 5.28 | 4.80 | 4.80 |
| d14 | 13.95 | 2.68 | 0.30 |
| d22 | 0.85 | 12.10 | 14.49 |
| d24 | 6.72 | 3.77 | 10.57 |
| d26 | 5.84 | 8.81 | 1.94 |
| Entrance pupil | 17.37 | 49.95 | 154.44 |
| Exit pupil | −96.21 | −174.21 | 42.84 |
| Front principal point | 22.28 | 69.21 | 383.94 |
| Rear principal point | −2.78 | −19.60 | −75.82 |

Zoom lens unit data

| Lens unit | Start surface | Focal length | Unit length | Front principal point | Rear principal point |
|---|---|---|---|---|---|
| 1 | 1 | 29.61 | 9.29 | 2.60 | −3.27 |
| 2 | 6 | −6.25 | 7.03 | 0.99 | −4.28 |
| 3 | 12 | −47.45 | 5.56 | 4.72 | −0.63 |
| 4 | 15 | 12.16 | 11.12 | −0.59 | −8.24 |
| 5 | 23 | −15.39 | 0.70 | 0.24 | −0.15 |
| 6 | 25 | 14.17 | 3.46 | 0.95 | −1.47 |
| GB | 27 | ∞ | 0.80 | 0.26 | −0.26 |

Lens element data

| lens | Start surface | Focal length |
|---|---|---|
| 1 | 1 | −54.74 |
| 2 | 2 | 41.96 |
| 3 | 4 | 33.59 |
| 4 | 6 | −8.47 |
| 5 | 8 | −6.89 |
| 6 | 10 | 9.75 |
| 7 | 13 | −47.45 |
| 8 | 15 | 10.80 |
| 9 | 18 | −16.42 |
| 10 | 20 | 8.49 |
| 11 | 21 | −11.52 |
| 12 | 23 | −15.39 |
| 13 | 25 | 14.17 |
| 14 | 27 | 0.00 |

Numerical Example 4

Unit mm

Surface data

| Surface No. | r | d | nd | vd | Effective diameter |
|---|---|---|---|---|---|
| 1 | 60.269 | 1.10 | 1.84666 | 23.8 | 27.53 |
| 2 | 26.489 | 5.05 | 1.49700 | 81.5 | 26.22 |
| 3 | −76.755 | 0.10 | | | 26.09 |
| 4 | 21.031 | 3.33 | 1.77250 | 49.6 | 23.09 |
| 5 | 75.809 | (Variable) | | | 22.45 |
| 6* | −46.672 | 1.05 | 1.85135 | 40.1 | 12.32 |
| 7* | 13.268 | 2.42 | | | 8.86 |
| 8 | −8.325 | 0.60 | 1.88300 | 40.8 | 8.24 |
| 9 | 8.584 | 0.10 | | | 8.11 |
| 10 | 9.151 | 1.90 | 1.94595 | 18.0 | 8.16 |
| 11 | −84.808 | (Variable) | | | 8.13 |
| 12 | ∞ | (Variable) | | | 11.31 |
| 13* | 6.467 | 4.00 | 1.51633 | 64.1 | 7.27 |
| 14* | −21.838 | 1.00 | | | 6.41 |
| 15(SP) | ∞ | 1.00 | | | 5.67 |
| 16 | 89.305 | 0.60 | 1.85026 | 32.3 | 5.56 |
| 17 | 6.084 | 1.09 | | | 5.43 |
| 18 | 7.546 | 3.64 | 1.51742 | 52.4 | 6.30 |
| 19 | −7.668 | 0.60 | 1.88300 | 40.8 | 6.56 |
| 20* | −22.132 | (Variable) | | | 6.86 |
| 21* | 19.312 | 2.83 | 1.48749 | 70.2 | 10.24 |
| 22 | −43.947 | (Variable) | | | 10.10 |
| 23 | ∞ | 0.80 | 1.51633 | 64.1 | 20.00 |
| 24 | ∞ | 4.89 | | | 20.00 |
| IP | ∞ | | | | |

Aspheric surface data

6th surface

K = 0.00000e+000 A 4 = 2.27484e−004 A 6 = 1.69367e−005
A 8 = −3.96934e−007 A10 = 3.67104e−009

-continued

Unit mm

7th surface

K = −1.79858e+000 A 4 = 1.66303e−004 A 6 = 2.60989e−005
A 8 = 3.77154e−008 A10 = 1.84548e−008
13th surface K = −5.56364e−001 A 4 = −5.59307e−005 A 6 = 6.34812e−007
A 8 = −1.11004e−008
14th surface K = 0.00000e+000 A 4 = 1.38992e−004
20th surface K = −4.82233e+000 A 4 = 3.65336e−005 A 6 = 7.10381e−006
A 8 = −3.92807e−007 A10 = 1.65954e−008
21st surface K = 0.00000e+000 A 4 = 6.02068e−005 A 6 = −1.64175e−006
A 8 = 3.06501e−008

Various data
zoom ratio 15.67

|  | Wide | Middle | Tele |
|---|---|---|---|
| focal length | 5.73 | 22.00 | 89.77 |
| F-number | 3.50 | 4.59 | 5.49 |
| Half angle of view (°) | 31.43 | 9.04 | 2.23 |
| Image height | 3.50 | 3.50 | 3.50 |
| Total lens length | 71.65 | 80.06 | 86.60 |
| BF | 4.89 | 4.89 | 4.89 |
| d 5 | 0.50 | 10.50 | 17.50 |
| d11 | 6.75 | 5.10 | 4.80 |
| d12 | 17.21 | 6.55 | 4.30 |
| d20 | 5.79 | 6.60 | 23.79 |
| d22 | 5.29 | 15.21 | 0.10 |
| d24 | 4.89 | 4.89 | 4.89 |
| Entrance pupil | 16.81 | 57.16 | 230.25 |
| Exit pupil | −27.17 | −39.61 | 477.85 |
| Front principal point | 21.51 | 68.29 | 337.06 |
| rear principal point | −0.83 | −17.11 | −84.88 |

Zoom lens unit data

| Lens unit | Start surface | Focal length | Unit length | Front principal point | Rear principal point |
|---|---|---|---|---|---|
| 1 | 1 | 29.06 | 9.58 | 3.22 | −2.74 |
| 2 | 6 | −5.25 | 6.08 | 1.51 | −2.71 |
| MR | 12 | ∞ | 0.00 | 0.00 | −0.00 |
| 3 | 13 | 16.98 | 11.93 | −2.90 | −10.75 |
| 4 | 21 | 27.93 | 2.83 | 0.59 | −1.34 |
| GB | 23 | ∞ | 0.80 | 0.26 | −0.26 |

Lens element data

| lens | Start surface | Focal length |
|---|---|---|
| 1 | 1 | −56.67 |
| 2 | 2 | 40.28 |
| 3 | 4 | 36.70 |
| 4 | 6 | −12.04 |
| 5 | 8 | −4.71 |
| 6 | 10 | 8.82 |
| 7 | 13 | 10.15 |
| 8 | 16 | −7.70 |
| 9 | 18 | 8.00 |
| 10 | 19 | −13.55 |
| 11 | 21 | 27.93 |
| 12 | 23 | 0.00 |

Numerical Example 5

Unit mm

Surface data

| Surface No. | r | d | nd | vd | Effective diameter |
|---|---|---|---|---|---|
| 1 | 40.115 | 1.10 | 1.84666 | 23.8 | 27.50 |
| 2 | 22.601 | 5.01 | 1.49700 | 81.5 | 24.86 |
| 3 | −639.469 | (Variable) |  |  | 24.29 |
| 4 | 22.411 | 3.31 | 1.77250 | 49.6 | 23.18 |
| 5 | 96.137 | (Variable) |  |  | 22.69 |
| 6 | 121.669 | 1.05 | 1.84954 | 40.1 | 13.43 |
| 7* | 8.387 | 3.09 |  |  | 10.13 |
| 8 | −13.033 | 0.60 | 1.88300 | 40.8 | 9.44 |
| 9 | 8.611 | 0.10 |  |  | 9.08 |
| 10 | 9.163 | 2.11 | 1.94595 | 18.0 | 9.09 |
| 11 | 293.593 | 4.80 |  |  | 9.00 |
| 12 | ∞ | (Variable) |  |  | 11.31 |
| 13* | 7.266 | 3.67 | 1.55332 | 71.7 | 8.20 |
| 14* | −530.318 | 1.00 |  |  | 7.18 |
| 15(SP) | ∞ | 1.00 |  |  | 6.53 |
| 16 | 9.580 | 0.60 | 1.84666 | 23.8 | 6.37 |
| 17 | 5.742 | 1.45 |  |  | 6.03 |
| 18 | 10.456 | 3.47 | 1.56732 | 42.8 | 6.45 |
| 19 | −9.352 | 0.60 | 1.80610 | 33.3 | 6.47 |
| 20 | −35.445 | (Variable) |  |  | 6.58 |
| 21 | −15.120 | 0.70 | 1.77250 | 49.6 | 6.99 |
| 22 | 118.961 | (Variable) |  |  | 7.26 |
| 23* | 12.808 | 3.49 | 1.48749 | 70.2 | 11.80 |
| 24 | −18.982 | (Variable) |  |  | 11.77 |
| 25 | ∞ | 0.80 | 1.51633 | 64.1 | 20.00 |
| 26 | ∞ | 2.22 |  |  | 20.00 |
| IP | ∞ |  |  |  |  |

Aspheric surface data

7th surface

K = 2.50717e−002 A 4 = −1.20472e−006 A 6 = −6.57466e−006
A 8 = 3.87504e−007 A10 = −9.80177e−009
13th surface K = −3.62944e−001 A 4 = −9.47829e−005 A 6 = −1.02524e−006
A 8 = −1.04732e−008
14th surface K = 0.00000e+000 A 4 = −9.61549e−007
23rd surface K = 0.00000e+000 A 4 = −9.18726e−005 A 6 = 4.92067e−007
A 8 = −1.16408e−008

Various data
zoom ratio 16.00

|  | Wide | Middle | Tele |
|---|---|---|---|
| Focal length | 5.41 | 23.69 | 86.55 |
| F-number | 3.07 | 4.43 | 5.75 |
| Half angle of view (°) | 32.53 | 8.29 | 2.28 |
| Image height | 3.45 | 3.45 | 3.45 |
| Total lens length | 71.52 | 82.05 | 88.34 |
| BF | 2.22 | 2.22 | 2.22 |
| d 3 | 0.45 | 0.80 | 0.91 |
| d 5 | 0.60 | 10.84 | 17.14 |
| d12 | 21.31 | 7.45 | 4.30 |
| d20 | 5.69 | 8.24 | 6.56 |
| d22 | 1.00 | 5.97 | 17.13 |
| d24 | 2.30 | 8.58 | 2.13 |
| Entrance pupil | 18.78 | 63.41 | 196.24 |
| Exit pupil | −25.37 | −204.08 | 40.49 |
| Front principal point | 23.13 | 84.38 | 478.51 |
| Rear principal point | −3.19 | −21.47 | −84.34 |

-continued

Unit mm

Zoom lens unit data

| Lens unit | Start surface | Focal length | Unit length | Front principal point | Rear principal point |
|---|---|---|---|---|---|
| 1 | 1 | 151.93 | 6.11 | −0.93 | −4.88 |
| 2 | 4 | 37.10 | 3.31 | −0.56 | −2.39 |
| 3 | 6 | −5.50 | 11.75 | 1.73 | −7.92 |
| 4 | 13 | 13.72 | 11.79 | 0.67 | −8.62 |
| 5 | 21 | −17.33 | 0.70 | 0.04 | −0.35 |
| 6 | 23 | 16.27 | 3.49 | 0.98 | −1.45 |
| GB | 25 | ∞ | 0.80 | 0.26 | −0.26 |

Lens element data

| lens | Start surface | Focal length |
|---|---|---|
| 1 | 1 | −62.96 |
| 2 | 2 | 44.03 |
| 3 | 4 | 37.10 |
| 4 | 6 | −10.65 |
| 5 | 8 | −5.80 |
| 6 | 10 | 9.96 |
| 7 | 13 | 12.99 |
| 8 | 16 | −18.24 |
| 9 | 18 | 9.29 |
| 10 | 19 | −15.92 |
| 11 | 21 | −17.33 |
| 12 | 23 | 16.27 |
| 13 | 25 | 0.00 |

TABLE 1

| | | Condition | | | | | |
|---|---|---|---|---|---|---|---|
| | | (1) | (2) | (3) | (4) | (5) | (6) |
| Numerical Example | 1 | 12.2 | 1.02 | 0.22 | 1.87 | 1.67 | 0 |
| | 2 | 12.6 | 0.92 | 0.16 | 1.87 | 2.19 | 0 |
| | 3 | 12.5 | 1.02 | 0.18 | 1.92 | 2.21 | 0 |
| | 4 | 17.1 | 1.10 | 0.31 | 1.87 | 5.47 | 0 |
| | 5 | 15.7 | 1.01 | 0.19 | 1.87 | 2.92 | 10 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-194001, filed Sep. 4, 2012, which is hereby incorporated by reference herein in its entirety.

What is claimed is:

1. A zoom lens for an image pickup apparatus, the zoom lens comprising in order from an object side to an image side:
   a front unit including a first lens unit having a positive refractive power and a second lens unit having a positive or negative refractive power;
   a reflective mirror which bends an optical path from the front unit; and
   a rear unit including two or more lens units,
   wherein:
   during zooming, the reflective mirror is not moved, and the first lens unit and at least two lens units included in the two or more lens units of the rear unit are moved in directions of optical axes of the front and rear units, respectively; and
   when the zoom lens is retracted into a body of the image pickup apparatus, at least one of (a) rotation of the reflective mirror such that a normal line to a reflective surface of the reflective mirror is brought closer to parallel to the optical axis of the rear unit and (b) axial movement of the reflective mirror in the direction of the optical axis of the rear unit is performed, and at least part of the front unit is moved into a space formed by the at least one of the rotation and the axial movement of the reflective mirror, and
   wherein the following conditions are satisfied:

$$10.5 < ft/|fn| < 30.0$$

$$0.80 < (Lf-L)/Lm < 1.30$$

where fn represents a focal length of a strongest negative power lens unit having a negative refractive power whose absolute value is maximum among those lens units each having a negative refractive power and included in the front unit, ft represents a focal length of the entire zoom lens at a telephoto end, Lm represents a length of the reflective mirror in a sectional plane including the optical axes of the front and rear units, Lf represents a sum of optical-axis-directional thicknesses of respective lens units included in the front unit, and L represents a shorter one of lengths in the direction of the optical axis of the front unit from an apex of a most-object side lens surface of the first lens unit to ends of the reflective mirror in the sectional plane after the zoom lens is retracted in the body of the image pickup apparatus.

2. A zoom lens according to claim 1, wherein the following condition is satisfied:

$$0.10 < fr/ft < 0.40$$

where fr represents a focal length of a most-image side lens unit disposed at a most-image side position among the lens units included in the rear unit.

3. A zoom lens according to claim 1, wherein the strongest negative power lens unit in the front unit includes two or more negative lenses, and the following condition is satisfied:

$$1.85 < Nn < 2.00$$

where Nn represents an average refractive index of materials of the two or more negative lenses.

4. A zoom lens according to claim 1, wherein one lens unit included in the rear unit comprises in order from the object side to the image side:
   a first sub-lens unit; and
   a second sub-lens unit which is moved in a direction including a vertical direction component to the optical axis of the rear unit for correcting image blur due to shaking of the zoom lens.

5. A zoom lens according to claim 1, wherein the following condition is satisfied:

$$1.50 < Zf/Zr < 6.00$$

where Zf represents a variable magnification ratio of the front unit, and Zr represents a variable magnification ratio of the rear unit.

6. A zoom lens according to claim 1, wherein the following condition is satisfied:

$$|\alpha| < 15°$$

where α represents an angle formed between the normal line of the reflective surface of the reflective mirror and the optical axis of the rear unit after the zoom lens is retracted in the body of the image pickup apparatus.

7. A zoom lens according to claim 1, wherein, when the zoom lens is retracted into the body of the image pickup apparatus, both the rotation and the axial movement of the reflective mirror are performed.

8. A zoom lens according to claim 1, wherein the front unit comprises in order from the object side to the image side:
the first lens unit; and
the second lens unit having the negative refractive power, and
wherein the rear unit comprises in order from the object side to the image side:
a third lens unit having a positive refractive power;
a fourth lens unit having a negative refractive power; and
a fifth lens unit having a positive refractive power.

9. A zoom lens according to claim 1, wherein the front unit comprises in order from the object side to the image side:
the first lens unit;
the second lens unit having the negative refractive power; and
a third lens unit having a negative refractive power, and
wherein the rear unit comprises in order from the object side to the image side:
a fourth lens unit having a positive refractive power;
a fifth lens unit having a negative refractive power; and
a sixth lens unit having a positive refractive power.

10. A zoom lens according to claim 1, wherein the front unit comprises in order from the object side to the image side:
the first lens unit; and
the second lens unit having the negative refractive power, and
wherein the rear unit comprises in order from the object side to the image side:
a third lens unit having a negative refractive power;
a fourth lens unit having a positive refractive power;
a fifth lens unit having a negative refractive power; and
a sixth lens unit having a positive refractive power.

11. A zoom lens according to claim 1, wherein the front unit comprises in order from the object side to the image side:
the first lens unit; and
the second lens unit having the negative refractive power, and
wherein the rear unit comprises in order from the object side to the image side:
a third lens unit having a positive refractive power; and
a fourth lens unit having a positive refractive power.

12. A zoom lens according to claim 1, wherein the front unit comprises in order from the object side to the image side:
the first lens unit;
the second lens unit having the positive refractive power; and
a third lens unit having a negative refractive power, and
wherein the rear unit comprises in order from the object side to the image side:
a fourth lens unit having a positive refractive power;
a fifth lens unit having a negative refractive power; and
a sixth lens unit having a positive refractive power.

13. An image pickup apparatus comprising:
a body of the image pickup apparatus;
a zoom lens; and
an image sensor which receives an image formed by the zoom lens,
wherein the zoom lens comprising in order from an object side to an image side:
a front unit including a first lens unit having a positive refractive power and a second lens unit having a positive or negative refractive power;
a reflective mirror which bends an optical path from the front unit; and
a rear unit including two or more lens units, wherein:
during zooming, the reflective mirror is not moved, and the first lens unit and at least two lens units included in the two or more lens units of the rear unit are moved in directions of optical axes of the front and rear units, respectively; and
when the zoom lens is retracted into the body of the image pickup apparatus, at least one of (a) rotation of the reflective mirror such that a normal line to a reflective surface of the reflective mirror is brought closer to parallel to the optical axis of the rear unit and (b) axial movement of the reflective mirror in the direction of the optical axis of the rear unit is performed, and at least part of the front unit is moved into a space formed by the at least one of the rotation and the axial movement of the reflective mirror, and
wherein the following conditions are satisfied:

$$10.5 < ft/|fn| < 30.0$$

$$0.80 < (Lf-L)/Lm < 1.30$$

where fn represents a focal length of a strongest negative power lens unit having a negative refractive power whose absolute value is maximum among those lens units each having a negative refractive power and included in the front unit, ft represents a focal length of the entire zoom lens at a telephoto end, Lm represents a length of the reflective mirror in a sectional plane including the optical axes of the front and rear units, Lf represents a sum of optical-axis-directional thicknesses of respective lens units included in the front unit, and L represents a shorter one of lengths in the direction of the optical axis of the front unit from an apex of a most-object side lens surface of the first lens unit to ends of the reflective mirror in the sectional plane after the zoom lens is retracted in the body of the image pickup apparatus.

* * * * *